(12) United States Patent
Soejima

(10) Patent No.: US 7,114,094 B2
(45) Date of Patent: Sep. 26, 2006

(54) INFORMATION PROCESSING SYSTEM FOR JUDGING IF BACKUP AT SECONDARY SITE IS NECESSARY UPON FAILOVER

(75) Inventor: Kenichi Soejima, Odawara (JP)

(73) Assignee: Hitachi, Ltd., Tokyo (JP)

( * ) Notice: Subject to any disclaimer, the term of this patent is extended or adjusted under 35 U.S.C. 154(b) by 252 days.

(21) Appl. No.: 10/817,862

(22) Filed: Apr. 6, 2004

(65) Prior Publication Data

US 2005/0160305 A1    Jul. 21, 2005

(30) Foreign Application Priority Data

Jan. 9, 2004    (JP) .............................. 2004-004670

(51) Int. Cl.
*G06F 11/00* (2006.01)

(52) U.S. Cl. ............................................ 714/6; 714/15

(58) Field of Classification Search .................... None
See application file for complete search history.

(56) References Cited

U.S. PATENT DOCUMENTS

| | | | |
|---|---|---|---|
| 5,155,845 A | | 10/1992 | Beal et al. |
| 6,195,760 B1 * | | 2/2001 | Chung et al. .................. 714/4 |
| 6,694,447 B1 * | | 2/2004 | Leach et al. .................... 714/6 |
| 6,898,727 B1 * | | 5/2005 | Wang et al. .................... 714/4 |
| 6,912,629 B1 * | | 6/2005 | West et al. ................. 711/161 |
| 6,920,580 B1 * | | 7/2005 | Cramer et al. ................. 714/4 |
| 2002/0065827 A1 * | | 5/2002 | Christie et al. ................ 707/10 |
| 2003/0126107 A1 * | | 7/2003 | Yamagami ...................... 707/1 |
| 2003/0126388 A1 * | | 7/2003 | Yamagami .................. 711/162 |
| 2004/0078654 A1 | | 4/2004 | Holland et al. |
| 2004/0260899 A1 * | | 12/2004 | Kern et al. .................. 711/162 |
| 2005/0071588 A1 | | 3/2005 | Spear et al. |
| 2005/0071708 A1 * | | 3/2005 | Bartfai et al. ................... 714/5 |
| 2005/0114741 A1 | | 5/2005 | Chen et al. |
| 2005/0125557 A1 | | 6/2005 | Vasudevan et al. |
| 2005/0138461 A1 * | | 6/2005 | Allen et al. ..................... 714/4 |

* cited by examiner

*Primary Examiner*—Scott Baderman
*Assistant Examiner*—Paul Contino
(74) *Attorney, Agent, or Firm*—Mattingly, Stranger, Malur & Brundidge, P.C.

(57) ABSTRACT

An information processing system has: information processing apparatus installed at each site, the apparatuses being interconnected with each other; fail-over processor realized by program executed by a processing apparatus, wherein when failure occurs, the fail-over processor performs to fail-over of making another different from the processing apparatus hit by the failure inherit processes executed by the processing apparatus hit by the failure; a recovery capability judge for judging whether essential data is managed in recoverable state at any processing apparatus excepting the processing apparatus hit by the failure, when the fail-over is executed passing from the processing apparatus hit by the failure to the other, the essential data necessary for performing fail-over; and backup data generator for generating backup data necessary for recovering the essential data if the data is not managed in recoverable state.

19 Claims, 18 Drawing Sheets

| BACKUP HOLDING CONDITIONS | 301 | 302 | 303 |
|---|---|---|---|
| ESSENTIAL DATA IDENTIFICATION INFORMATION | BACKUP NECESSITY | BACKUP INTERVAL |
| COMPANY A CUSTOMER DATA | NECESSARY | 8 HOURS |
| INTERMEDIATE FILE | UNNECESSARY | — |

FIG.4

DATA LIST

| LOGICAL VOLUME IDENTIFICATION INFORMATION 401 | ESSENTIAL DATA IDENTIFICATION INFORMATION 402 | DATA TYPE 403 |
|---|---|---|
| VOLUME #1 | COMPANY A CUSTOMER DATA | REMOTE COPY DATA |
| VOLUME #2 | COMPANY A CUSTOMER DATA | BACKUP DATA 2003:08:08: 13:00 |
| VOLUME #3 | INTERMEDIATE FILE | MASTER DATA |

FIG.8

| 5010 CONFIGURATION INFORMATION | | | | |
|---|---|---|---|---|
| LOGICAL VOLUME IDENTIFICATION INFORMATION | DISK DRIVE IDENTIFICATION INFORMATION | STORAGE CAPACITY | IN-USE FLAG | REMOTE COPY INFORMATION |
| VOLUME #1 | HARD DISK DRIVE 2124 | 18GB | IN-USE | COPY TO VOLUME #2 OF STORAGE SYSTEM C2320 |
| | | | | |

Columns: 5010, 5020, 5030, 5040, 5050

| 5010 CONFIGURATION INFORMATION | | | | |
|---|---|---|---|---|
| LOGICAL VOLUME IDENTIFICATION INFORMATION | DISK DRIVE IDENTIFICATION INFORMATION | STORAGE CAPACITY | IN-USE FLAG | REMOTE COPY INFORMATION |
| VOLUME #1 | HARD DISK DRIVE 2124 | 18GB | IN-USE | COPY TO VOLUME #2 OF STORAGE SYSTEM C2320 |
| VOLUME #2 | HARD DISK DRIVE 2125 | 18GB | NOT IN-USE | |
| VOLUME #3 | HARD DISK DRIVE 5200 | 18GB | NOT IN-USE | |
| VOLUME #4 | HARD DISK DRIVE 5250 | 18GB | NOT IN-USE | |
| VOLUME #5 | HARD DISK DRIVE 5350 | 12GB | NOT IN-USE | |

Columns: 5010, 5020, 5030, 5040, 5050

FIG.10

| 5010 CONFIGURATION INFORMATION | | | | | 2222 |
|---|---|---|---|---|---|
| LOGICAL VOLUME IDENTIFICATION INFORMATION | DISK DRIVE IDENTIFICATION INFORMATION | STORAGE CAPACITY | IN-USE FLAG | REMOTE COPY INFORMATION | |
| VOLUME #1 | HARD DISK DRIVE 6200 | 18GB | IN-USE | | |
| VOLUME #2 | HARD DISK DRIVE 2224 | 18GB | NOT IN-USE | | |
| VOLUME #3 | HARD DISK DRIVE 6250 | 18GB | IN-USE | | |
| VOLUME #4 | HARD DISK DRIVE 2225 | 18GB | NOT IN-USE | | |
| VOLUME #5 | HARD DISK DRIVE 6300 | 24GB | NOT IN-USE | | |

(Columns: 5010, 5020, 5030, 5040, 5050)

FIG.11

| 5010 CONFIGURATION INFORMATION | | | | | 2322 |
|---|---|---|---|---|---|
| LOGICAL VOLUME IDENTIFICATION INFORMATION | DISK DRIVE IDENTIFICATION INFORMATION | STORAGE CAPACITY | IN-USE FLAG | REMOTE COPY INFORMATION | |
| VOLUME #1 | HARD DISK DRIVE 7200 | 18GB | NOT IN-USE | | |
| VOLUME #2 | HARD DISK DRIVE 2324 | 18GB | IN-USE | COPY FROM VOLUME #1 OF STORAGE SYSTEM A2120 | |
| VOLUME #3 | HARD DISK DRIVE 2325 | 18GB | IN-USE | | |
| VOLUME #4 | HARD DISK DRIVE 7250 | 12GB | IN-USE | | |
| VOLUME #5 | HARD DISK DRIVE 7300 | 12GB | NOT IN-USE | | |

(Columns: 5010, 5020, 5030, 5040, 5050)

FIG.13

DATA CENTER

| DATA CENTER NAME | NODE IDENTIFICATION INFORMATION |
|---|---|
| DATA CENTER A2100 | NODE A2110 |
| DATA CENTER A2200 | NODE A2210 |
| DATA CENTER A2300 | NODE A2310 |

DATA LIST

| STORAGE SYSTEM IDENTIFICATION INFORMATION | LOGICAL VOLUME IDENTIFICATION INFORMATION | ESSENTIAL DATA IDENTIFICATION INFORMATION | DATA TYPE |
|---|---|---|---|
| STORAGE SYSTEM A2120 | VOLUME #1 | DATA #1 | MASTER DATA |
| | | | |

DATA LIST 2117

| STORAGE SYSTEM IDENTIFICATION INFORMATION | LOGICAL VOLUME IDENTIFICATION INFORMATION | ESSENTIAL DATA IDENTIFICATION INFORMATION | DATA TYPE |
|---|---|---|---|
| STORAGE SYSTEM A2120 | VOLUME #1 | DATA #1 | MASTER DATA |

DATA LIST 2217

| STORAGE SYSTEM IDENTIFICATION INFORMATION 8010 | LOGICAL VOLUME IDENTIFICATION INFORMATION 401 | ESSENTIAL DATA IDENTIFICATION INFORMATION 402 | DATA TYPE 403 |
|---|---|---|---|
| STORAGE SYSTEM B2220 | VOLUME #1 | DATA #2 | MASTER DATA |
| STORAGE SYSTEM B2220 | VOLUME #3 | DATA #3 | MASTER DATA |

FIG.17

DATA LIST 2317

| STORAGE SYSTEM IDENTIFICATION INFORMATION 8010 | LOGICAL VOLUME IDENTIFICATION INFORMATION 401 | ESSENTIAL DATA IDENTIFICATION INFORMATION 402 | DATA TYPE 403 |
|---|---|---|---|
| STORAGE SYSTEM C2320 | VOLUME #2 | DATA #1 | REMOTE COPY DATA |
| STORAGE SYSTEM C2320 | VOLUME #3 | DATA #1 | BACKUP DATA 2003:08:10: 13:00 |
| STORAGE SYSTEM C2320 | VOLUME #4 | DATA #1 | BACKUP DATA 2003:08:09 13:00 |

FIG.18

BACKUP HOLDING CONDITIONS 2118

| NECESSARY DATA IDENTIFICATION INFORMATION 301 | BACKUP NECESSITY 302 | BACKUP INTERVAL 303 | BACKUP CONDITION 11040 |
|---|---|---|---|
| DATA #1 | NECESSARY | 8 HOURS | PREFERENTIAL REMOTE BACKUP |
| DATA #2 | UNNECESSARY | | |
| DATA #3 | UNNECESSARY | | |

FIG.24

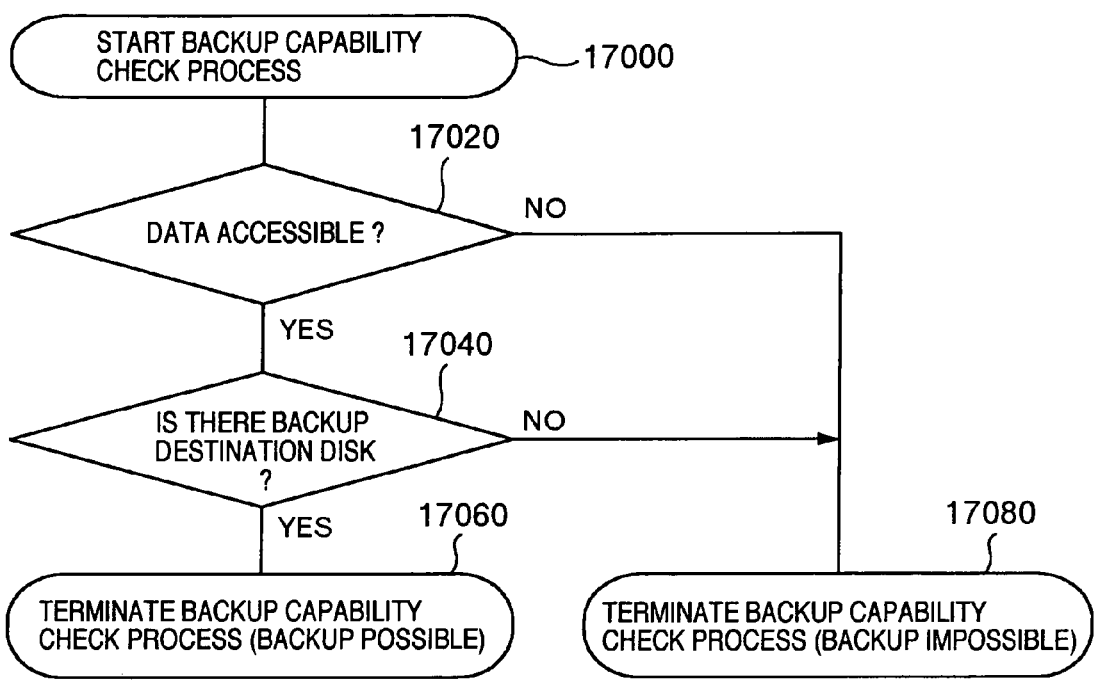

FIG.25

| FAILURE TYPE | BACKUP NECESSITY |
|---|---|
| NODE HALT, SHUT-DOWN OF INTER-NODE COMMUNICATIONS | NECESSARY |
| SHUT-DOWN OF COMMUNICATIONS BETWEEN NODE AND STORAGE SYSTEM | NECESSARY |
| SHUT-DOWN OF COMMUNICATIONS BETWEEN INTER-STORAGE-SYSTEMS | UNNECESSARY |
| STORAGE SYSTEM HALT | NECESSARY |
| CLUSTER SERVICE HALT | UNNECESSARY |
| FAILURE OF MASTER DISK OR REMOTE COPY DESTINATION DISK | UNNECESSARY |
| BACKUP DISK FAILURE | NECESSARY |
| OTHERS | NECESSARY |

INFORMATION PROCESSING SYSTEM FOR JUDGING IF BACKUP AT SECONDARY SITE IS NECESSARY UPON FAILOVER

CROSS REFERENCE TO RELATED APPLICATIONS

Japanese Patent Application No. 2004-004670 applied on Jan. 9, 2004 in Japan is cited to support the present invention.

BACKGROUND OF THE INVENTION

1. Field of the Invention

The present invention relates to am information processing system, an information processing apparatus, and a control method for the information processing system.

2. Description of the Related Art

Attention has been paid to disaster recovery in an information processing system. With one of known technologies for realizing disaster recovery, copies of data in a storage apparatus installed at a primary site are managed also by a storage apparatus installed at a remote site. When the primary site is hit by a disaster, a computer at the remote site inherits processes executed by a computer at the primary site, i.e., performs so-called fail-over, to continue the processes by using data copied to the storage apparatus at the remote site.

In the information processing system, unexpected failures of data may happen such as miss-operation of data and contamination by viruses. In order to allow data at past time points to be recovered, either the primary site or the remote site periodically backs up copies of data.

The specification of U.S. Pat. No. 5,155,845 discloses a data storage system which stores redundant data copies in disk drives.

If failures occur at the backup executing site, the processes at this site are inherited to another site. However, backup data does not exist until the data is backed up. In this case, if disasters or other failures occur at the fail-over destination site, there is a fear that data cannot be recovered.

SUMMARY OF THE INVENTION

The present invention has been made under such circumstances and aims at providing an information processing apparatus capable of shortening the time duration while backup data does not exist in the system, an information processing apparatus and a control method for the information processing system.

One of main inventions achieving the object provides an information processing system comprising:

an information processing apparatus installed at each of a plurality of sites, the information processing apparatuses being interconnected to be able to communicate with each other; a fail-over processor realized by a program executed by one or more information processing apparatuses, wherein when a failure occurs at one of the information processing apparatuses, the fail-over processor performs a process related to fail-over of making another information processing apparatus different from the information processing apparatus hit by the failure inherit processes executed by the information processing apparatus hit by the failure; a recovery capability judge for judging whether essential data is managed in a recoverable state at any one of the information processing apparatuses excepting the information processing apparatus hit by the failure, when the fail-over is executed passing from the information processing apparatus hit by the failure to the other information processing apparatus, the essential data being necessary data for performing a process to be dealt with the fail-over; and a backup data generator for generating backup data necessary for recovering the essential data if the essential data is not managed in the recoverable state.

The present invention can provide an information processing apparatus capable of shortening the time duration while backup data does not exist in the system, an information processing apparatus and a control method for the information processing system.

A cluster system embodying the present invention will be described hereinunder. A cluster system is an information processing system utilizing cluster technologies known as a means for realizing redundancy of the system. In order to deal with any possible failure in a computer, the cluster system prepares a second computer in addition to a first computer for executing processes. In the following description, computers constituting a cluster are also called information processing apparatuses or nodes.

When the first computer detects a failure occurred at the first computer (failure detector), it transmits failure information to the second computer (failure information transceiver). The second computer detects a failure at the first computer (failure detector) when it receives failure information from the first computer (failure information transceiver) or detects an inability of communications with the first computer.

When any failure occurs at the first computer under execution of processes, the second computer inherits the processes (fail-over) so that the whole system can continue the processes. In this manner, the fail-over type cluster improves the reliability and availability of the computer system. From this reason, the cluster is adopted by various important systems.

In present computer systems, each computer holds valuable information and is required to safely store data even if it is hit by a natural calamity or the like. It is therefore expected for a computer system to improve the availability by the cluster and in addition have a means for data redundancy and data recovery.

For data redundancy, there are techniques (hereinafter called a remote copy) of storing copies of data in a plurality of storage apparatuses. Some storage apparatuses can realize a remote copy among a plurality of storage apparatuses without involving computers. According to the remote copy techniques, copies of data at a designated time can be stored in two storage apparatuses. In the following description, the storage apparatus is also called a storage system.

It is also possible for a first storage apparatus to transmit data written therein to a second storage apparatus at an optional time and for the second storage apparatus to write the received data therein. The data written in one (first storage apparatus) of the two storage apparatuses is transmitted to the second storage apparatus (write data transmitter). The second storage apparatus receives the write data from the first storage apparatus (write data receiver) and stores the received write data. Therefore, data stored in the first storage apparatus and data stored in the second storage apparatus are updated to have the same contents. In this manner, until the remote copy is stopped, the data written in the remote copy source is written also in the remote copy destination so that the contents of the data in the two storage apparatuses can be synchronized.

A combination of the above-described remote copy techniques and cluster techniques can reinforce redundancy of the system and data. It is therefore possible to improve the reliability and availability of a computer system.

Backup techniques are know which manage data in a recoverable state in order to recover the data lost by a failure of a storage apparatus, natural calamity or the like and the data destroyed by user miss-operation or the like. Managing data in the recoverable state is, for example, to store a copy of the necessary data (hereinafter called essential data) for information processing stored in a storage apparatus in another storage apparatus. During the backup process, the essential data is copied to another storage medium at a predetermined time or at a timing designated by an administrator. A storage medium may be a floppy disk, a hard disk, a magnetic disk, a CD-R, a DVD-RAM or the like. Data (hereinafter called backup data) necessary for recovering the essential data is not limited only to a mere copy of the data, but it may be, for example, compressed data, hash values necessary for recovering original essential data, or the like.

In the system utilizing the combination of the above-described remote copy techniques and cluster techniques, data stored in the storage apparatus at one site is copied to the storage apparatus at another site (often at a remote cite) through remote copy. In this case, a change in the data at the copy source is reflected also upon the copy destination. Therefore, if the data at the copy source is destroyed, for example, by erroneous modification of the copy source data or by contamination of the copy source data by viruses, the copy destination data is also destroyed. In order to deal with such situation, it is desired to have a copy of data through backup separately from a copy through remote copy.

Although the latest data is always maintained by remote copy, consistency between data is not necessarily guaranteed. Namely, if one piece of information is represented by both data A and data B, data consistency does not exist at the time when only the data A is updated, whereas data consistency exists at the time when both the data A and data B are updated. Therefore, backup is performed in some cases depending upon the kind of data to be stored, in order to hold data in a state that consistency of data is maintained.

The backup location is an important issue of backup. For example, in order not to lose data even if a physical disk storing the data in a storage apparatus happens to have a failure, the data is backed up in another physical disk. In order not to lose essential data even if a disaster occurs at the site where a storage apparatus is installed, the data may be backed up in the same storage apparatus and in addition the data may be backup up at a geographically remote site by utilizing the above-described remote copy techniques.

It is also an important issue that at what interval a backup process is performed. The amount of data dealt with present information processing is increasing. If the backup is performed too often, a load of backup processes may lower the processing efficiency of the whole system. Generally the backup process is performed in a cluster system every several hours to every day. The frequency of the backup process is generally set to the period during which essential data can be recovered by some method even if the essential data is lost during the period from the start of a backup process to a start of the next backup process. The time duration until there occurs a fear that the essential data cannot be recovered from the backup data is used as the effective term of the backup data, and it is recommended to perform a backup process before the effective term.

BRIEF DESCRIPTION OF THE DRAWINGS

FIG. 4 is a diagram showing an example of a data list according to the embodiment of the invention.

FIG. 8 is a diagram illustrating configuration information stored in a storage system according to the embodiment of the invention.

FIG. 9 is a diagram showing an example of configuration information 2122 stored in a storage system-A 2120 according to the embodiment of the invention.

FIG. 10 is a diagram showing an example of configuration information 2222 stored in a storage system-B 2220 according to the embodiment of the invention.

FIG. 11 is a diagram showing an example of configuration information 2322 stored in a storage system-C 2320 according to the embodiment of the invention.

FIG. 13 is a diagram showing a data center list according to the embodiment of the invention.

FIG. 14 is a diagram showing a data center list stored at a node according to the embodiment of the invention.

FIG. 15 is a diagram showing a data center list 2117 stored at a node-A 2110 according to the embodiment of the invention.

FIG. 16 is a diagram showing a data center list 2217 stored at a node-B 2210 according to the embodiment of the invention.

FIG. 17 is a diagram showing a data center list 2317 stored at a node-C 2310 according to the embodiment of the invention.

FIG. 18 is a diagram showing an example of backup holding conditions 2118 stored at the node-A 2110 according to the embodiment of the invention.

FIG. 24 is a diagram illustrating a backup capability check process flow according to the embodiment of the invention.

FIG. 25 is a diagram showing an example of a failure specific backup necessity list according to the embodiment of the invention.

DESCRIPTION OF THE EMBODIMENTS

First Embodiment

Figure 1:
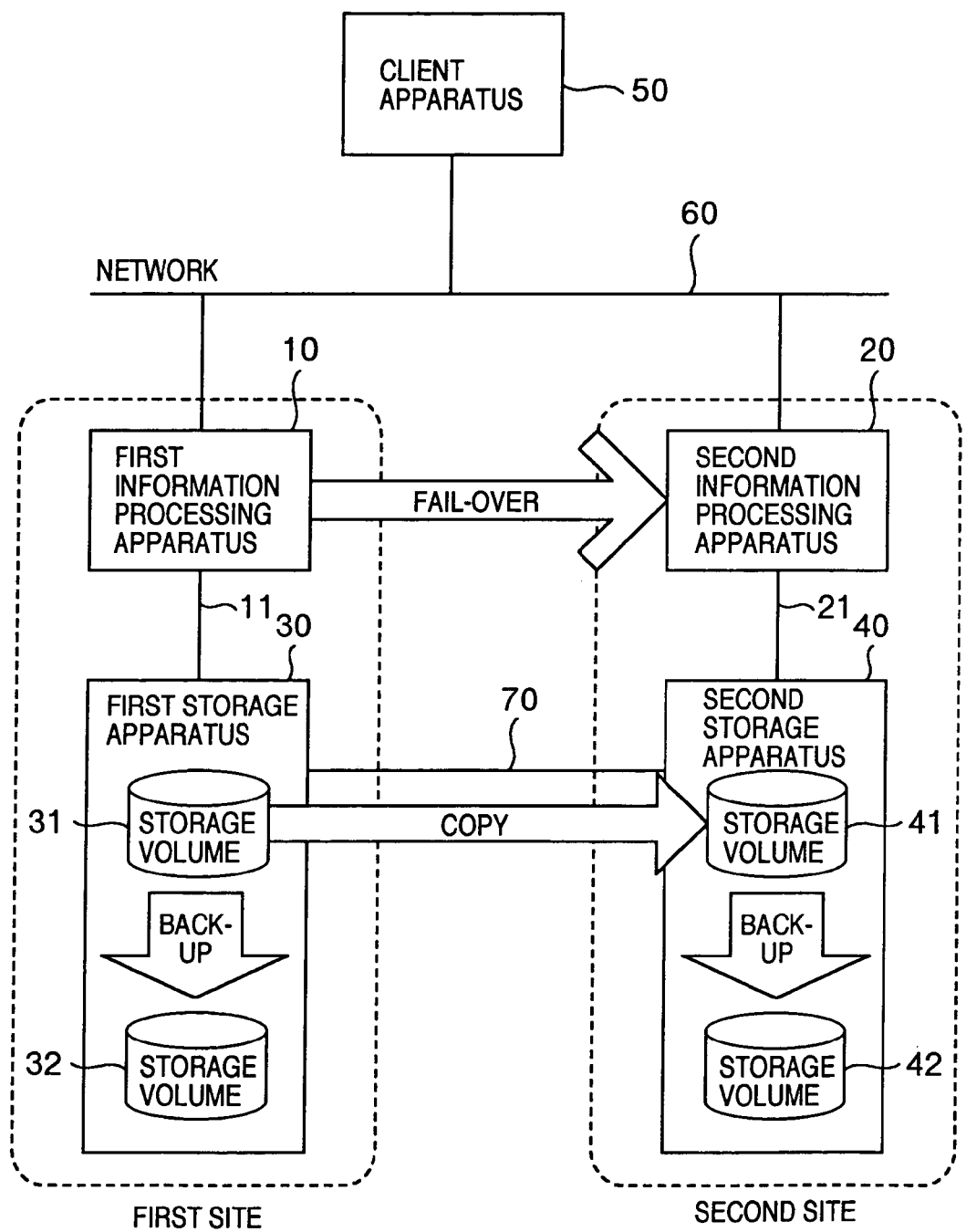
FIG. 1 is a diagram showing the overall configuration of a cluster system according to an embodiment of the invention.

Description will be made on an embodiment of a cluster system adopting the present invention wherein two computers (information processing apparatuses) constitute a cluster. FIG. 1 is a diagram showing the overall configuration of the cluster system of the first embodiment. In the computer system shown in FIG. 1, a client apparatus 50 transmits a request to a first information processing apparatus 10, and the first information apparatus 10 performs various information processing in accordance with the received request.

The first information processing apparatus 10 is installed at a first site. The first information processing apparatus 10 is connected to a network 60 to communicate with the client apparatus 50. A second information processing apparatus 20 is installed at a second site remote from the first site. The first and second sites are, for example, data centers where computers and storage apparatuses are installed. The second information processing apparatus 20 is also connected to the network 60 to communicate with the first information processing apparatus 10 and client apparatus 50.

The first and second information processing apparatuses 10 and 20 are both computers equipped with central processing units (CPUs) and memories. The first and second information processing apparatuses 10 and 20 are, for example, personal computers, work stations, main frames or the like. CPUs of the first and second information processing apparatuses 10 and 20 execute operating systems such as Windows (registered trademark) and UNIX (registered trademark). A program for executing the operating system is stored in the memories of the first and second information processing apparatuses 10 and 20. CPUs of the first and second information processing apparatuses 10 and 20 execute various application programs stored in the memories on the operating systems and provide various information processing services, cluster services, a backup process and the like. The programs for realizing the operating systems and application programs may be stored in a storage medium such as a hard disk, a semiconductor memory, an optical disk, a CD-ROM and a DVD-ROM, and read into the memories.

The first and second information processing apparatuses 10 and 20 are connected to corresponding storage apparatuses. The first storage apparatus 30 is connected to the first information processing apparatus 10 to supply storage volumes to the first information processing apparatus 10. The second storage apparatus 40 is connected to the second information processing apparatus 20 to supply storage volumes to the second information processing apparatus 20. The storage volume is a storage resource including a physical volume which is a physical storage area provided by a hard disk apparatus, a semiconductor memory device and a logical volume which is a storage area logically set on the physical volume. The first and second storage apparatuses 30 and 40 each can have a plurality of storage volumes. As shown in FIG. 1, the first and second storage apparatuses 30 and 40 each have two storage volumes. The storage volume 31 of the first storage apparatus 30 is the storage resource supplied from the first storage apparatus 30 to the first information processing apparatus 10. The storage apparatus 30 stores the essential data to be accessed by the application program to be executed by the first information processing apparatus 10. For example, the essential data is stored in the unit of storage area reserved as a table area of a database or in the unit of file of a file system. The essential data may be the whole data stored in the logical volume or the data stored in an arbitrary storage area. The first information processing apparatus 10 performs information processing by accessing, when necessary, the essential data stored in the logical volume 31. The application program to be executed by CPU of the first information processing apparatus 10 may be stored in the storage volume of the first storage apparatus 30. Similarly, the application program to be executed by the second information processing apparatus 20 may be stored in the storage volume of the second storage apparatus 40.

The first and second storage apparatuses 30 and 40 are interconnected by a communication path 70. The first and second storage apparatuses 30 and 40 may be interconnected via the network 60, although the communication path 70 and network 60 are drawn in FIG. 1 as different communication paths.

Remote copy is performed between the first and second storage apparatuses 30 and 40. The first storage apparatus 30 is a remote copy source and the second storage apparatus 40 is a remote copy destination. A copy of the essential data stored in the storage volume 31 of the first storage apparatus 30 is stored in the storage volume 41 of the second storage apparatus 40. The first storage apparatus 30 transmits write data written in the storage volume 31 to the second storage apparatus 40 (write data transmitter). The second storage apparatus 40 receives the write data from the first storage apparatus 30 (write data receiver) and writes it in the storage volume 41 (logical volume controller) to make the data contents stored in the storage volume 31 be coincident with the data contents stored in the storage volume 41. Since a copy of the essential data stored in the first storage device 30 is stored in the second storage apparatus 40 by remote copy, the redundancy of the essential data is increased and the maintenance of the essential data can be improved. If the application program to be executed by the first information processing apparatus 10 is stored in the first storage apparatus 30, a copy of the application program stored in the first storage apparatus 30 may be stored in the second storage apparatus 40 by remote copy. In this case, the second information processing apparatus 20 can execute the application program remote-copied to the second storage apparatus 40. It is therefore possible to maintain consistency between the application program to be executed by the first information processing apparatus 10 and the application program to be executed by the second information processing apparatus 20.

In this embodiment, the maintenance of the essential data is improved by forming a backup of data stored in the first storage apparatus 30 in addition to the remote copy from the first storage apparatus 30 to the second storage apparatus 40. The first information processing apparatus 10 transmits a command (backup command) of instructing a backup to the first storage apparatus 30 (backup data generator), and the first storage apparatus 30 makes a backup. The first storage apparatus 30 makes the backup by storing a copy of the essential data stored in the storage volume (first logical volume) 31 in the storage volume (second logical volume) 32. In this case, for example, the first information processing apparatus 10 stores identification information of the essential data and identification information of the storage volume 32 in one-to-one correspondence so that it is possible for the first information processing apparatus to manage the backup data being capable of restoring the essential data and having been stored by the first storage apparatus 30. This backup allows data at a past time point to be recovered even if the administrator performs a miss-operation of the essential data or the essential data is hit by viruses. In place of the backup by the storage apparatus 30, the first information processing apparatus 10 may perform a backup process of reading data from the storage volume 31 and writing it in a backup apparatus. In this case, since the first information processing apparatus 10 is in charge of the backup process, a process load of the storage apparatus can be reduced.

In this embodiment, although the essential data is subjected to the remote copy and backup in the unit of logical volume, the unit of physical volume or the unit of partial storage area of the storage volume may be used instead of the unit of logical volume.

The essential data may be backed up in a backup apparatus instead of the storage apparatus. The backup apparatus may be a floppy disk drive, a hard disk drive, a magnetic tape drive, a CD-R drive, a DVD-RAM drive or the like. In this case, the backup apparatus may be connected directly to the information processing apparatus or storage apparatus or may be connected to the network 60 to transmit data to be backed up via the network.

In this cluster system, the cluster service to be executed by the first information processing apparatus 10 performs, for example, a heart beat process of periodically transmitting a message to the second information processing apparatus 20 and confirming whether the second information processing apparatus 20 returns a response. The cluster service also performs a failure notifying process of transmitting to the second information processing apparatus 20 a message representative of a failure occurred at the first information processing apparatus 10, a failure in an apparatus connected to the first information processing apparatus 10, an error at the communication path or the like. These heart beat process and failure notifying process are realized also at the second information processing apparatus 20 in the similar manner to thereby transfer failure information between the first and second information processing apparatuses 10 and 20 (failure information transceiver) and detect any failure occurred at the information processing apparatuses.

The second information processing apparatus 20 detects a failure at the first site in accordance with the hear beat process or a failure notice from the first information processing apparatus 10 (failure detector). When the second information processing apparatus 20 detects a failure at the first site, it inherits the processes executed by the first information processing apparatus 10 (fail-over: fail-over processor).

When the processes executed by the first information processing apparatus 10 are inherited to the second information processing apparatus 20, the second information processing apparatus 20 performs a use start process such as transmitting a message representative of a use start to the second storage apparatus 40. This use start process is called "making the disk resource on line". Since a copy of the essential data stored in the first storage apparatus 20 is being stored in the second storage apparatus 40, the second information processing apparatus 20 can use the essential data used for the processes by the first information processing apparatus, by accessing the second storage apparatus 40.

In this case, if any failure does not occur at the first storage apparatus 30, the second storage apparatus 40 connected to the second information processing apparatus 20 may be set as the remote copy source, and the first storage apparatus 30 is set as the remote copy destination. By reversing the direction of the remote copy between the storage apparatuses (exchanging the copy source and destination), the remote copy can be continues without stopping the operation of the whole cluster system. By continuing the remote copy in the cluster system, the redundancy of the data stored in the cluster system can be maintained and the maintenance of the data can be improved.

The backup made by the first information processing apparatus 10 for the first storage apparatus 30 is also made by the second information processing apparatus 20. The second information processing apparatus transmits a backup command to the second storage apparatus 40 (backup data generator), and the second storage apparatus 40 performs a backup by storing the data stored in the storage volume (first logical volume) 41 in the storage volume (second logical volume) 42. Since the second storage apparatus 40 makes a backup in the storage volume 42, the backup can be made at higher speed than making a backup in a portable storage medium. However, the first and second storage apparatuses 30 and 40 can use as the backup destination not only the storage volume but also an external backup apparatus for example. The external backup apparatus may be a storage apparatus such as a tape drive, an optical disk drive and a hard disk drive. By using the portable storage medium as the backup destination, the maintenance of data can be improved, for example, by installing the storage medium at a physically remote site.

In a system configured by a combination of the remote copy techniques and cluster techniques, such as the cluster system shown in FIG. 1, if a failure such as fault and disaster of apparatuses occurs at the first site, the processes executed by the first information processing apparatus 10 are inherited by the second information processing apparatus 20. In this manner, the processes executed by the first information processing apparatus 10 can continue. However, if the first site periodically makes a backup of the essential data, there is a possibility that the backup data is lost when such a failure occurs. In this case, the backup data does not exist in the system until the second site makes the next backup. Therefore, if the essential data is destroyed during this period, there is a fear that the essential data cannot be recovered from the backup. In order to mitigate this fear, the following backup process is executed.

Outline of Backup Process After Fail-Over

Next, description will be made on the outline of the backup process to be executed upon the fail-over from the first information processing apparatus 10 to the second information processing apparatus 20.

Figures 2, 3:
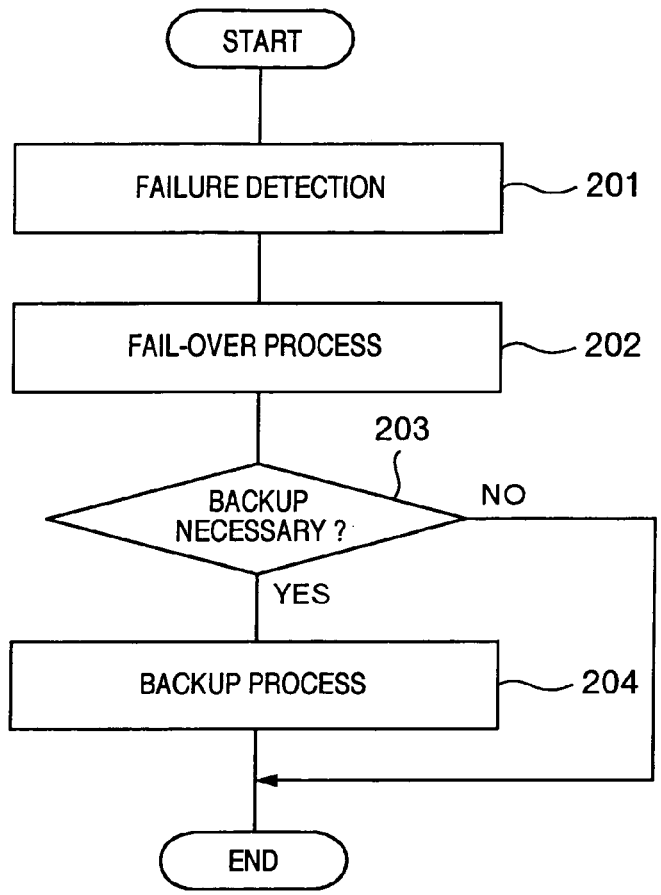
FIG. 2 is a diagram showing the outline of a process flow to be executed by a second information processing apparatus 20 during fail-over according to the embodiment of the invention.
FIG. 3 is a diagram showing an example of the backup holding conditions according to the embodiment of the invention.

FIG. 2 is a diagram illustrating the outline of the backup process to be executed by the second information processing apparatus 20 during fail-over. The following processes are realized while CPU of the second information processing apparatus 20 executes the application program stored in the memory.

When a failure at the first site is detected (Step 201), the second information processing apparatus 20 performs a fail-over process of inheriting the processes executed by the first information processing apparatus 10 (Step 202). The second information processing apparatus 20 judges in the manner to be described later whether or not the backup is necessary (Step 203). If the second information processing apparatus 20 judges that the backup is necessary (Step 203: No), the backup process is executed (Step 204). The backup process starts when the second information processing apparatus 20 transmits a command representative of a backup instruction to the second storage apparatus 40.

In order to judge whether a backup is necessary, the second information processing apparatus 20 stores backup holding conditions and a data list in the memory. In the following, the backup holding conditions and data list will be described.

Backup Holding Conditions

The backup holding conditions are stored in a table. The backup holding conditions include information such as whether the essential data requires a backup (recovery necessity information) and at what interval a backup is made if the backup is necessary. FIG. 3 is a diagram showing an example of the backup holding conditions. As shown in FIG. 3, the table of the backup holding conditions has an essential data identification information column 301, a backup necessity column 302 and a backup interval column 303.

Set to the essential data identification information column 301 is a name for identifying the essential data stored in the storage volume 31 of the first storage apparatus 30. For example, a name such as "Company A customer data" and "table area" or a number or the like assigned to each data record may be set to the essential data identification information column 301.

Set to the backup necessity column 302 is information on whether the essential data indicated by the data name column 301 requires a backup. If the essential data requires a backup, the backup interval column 303 is set with a time interval at which the essential data is periodically backed up.

Data List

Next, the data list will be described. The data list is stored in a table set with a data list accessible by the information processing apparatus. FIG. 4 is a diagram showing an example of the data list. As shown in FIG. 4, the data list has a logical volume identification information column 401, an essential data identification information column 402 and a data type column 403.

Set to the logical volume identification information column 401 is information necessary for the information processing apparatus to access the essential data or backup data. In this embodiment, since the essential data is backed up in the unit of logical volume, a logical unit number (LUN) which is the identification information of a logical volume is set to the logical volume identification information column 402.

Similar to the essential data identification information column 301 of the backup holding conditions, the name for identifying the essential data is set to the essential data identification information column 402. The name set to the essential data identification information column 402 allows the backup holding conditions to be related to the data list.

For example, the second information processing apparatus 20 judges that the backup data of "company A customer data" is stored in "Volume #2", and transmits a read request for the logical volume indicated by "Volume #2" to the second storage apparatus 40 so that the backup data can be read (backup data reader).

Set to the data type column 403 is information representative of the type of data stored in the second storage apparatus 40. "Remote copy data" is set to the data type column 403 corresponding to the logical volume storing the backup data copied from the first storage apparatus 30 to the second storage apparatus 40 by remote copy. "Backup data" is set to the data type column 403 corresponding to the logical volume which is the backup destination of the backup data backed up to another logical volume in the second storage apparatus 40. "Master data" is set to the data type column for the essential data which the second information processing apparatus 20 reads/writes relative to the second storage apparatus 40. When the "Backup data" is set to the data type column 403, the date and time when the backup was made (backup date and time) is additionally set.

The second information processing apparatus 20 can judge from the data list (backup data management information manager) whether the backup data exists or not. The second information processing apparatus 20 can grasp the backup date and time from the data type column 403 of the data list. Therefore, the second information processing apparatus can judge whether the effective backup data exists or not, by using as the effective term the term after the backup interval set to the backup holding conditions from the backup time and data. Namely, the effective term of the backup data can be set (backup effective term storage). A plurality of records may be stored in the data list as a backup history.

For example, the backup holding conditions and data list may be set by an administrator and stored in a storage device such as RAM and a hard disk of the information processing apparatus. The data list may be formed or updated by periodically accessing a storage device and acquiring the data stored in the storage device from the storage device.

The backup holding conditions and data list are stored also in the first information processing apparatus 10. The first information processing apparatus 10 refers to the backup holding conditions to acquire the name of data required to be backed up. By using the acquired data name as a key, identification information of the logical volume to be backed up is acquired from the data list. The logical volume indicated by the identification information of the acquired logical volume is backed up from the storage volume 31 to the storage volume 32.

The backup holding conditions and data list may be shared in common by the first information processing apparatus 10 and second information processing apparatus 20. For example, the first information processing apparatus 10 may transmit periodically the backup holding conditions and data list to the second information processing apparatus 20. Therefore, when the administrator updates the backup holding conditions and data list stored in the first information processing apparatus 10, this update can be reflected upon the second information processing apparatus 20. A load of the administrator managing a plurality of sites can be reduced.

The backup holding conditions and data list may be stored not only in the memories of the first information processing apparatus 10 and second information processing apparatus 20 but also in the storage device such as a hard disk of the information processing apparatus. The backup holding conditions and data list may be stored in the first storage apparatus 30 and second storage apparatus 40.

Backup Process After Fail-Over

Figure 5:
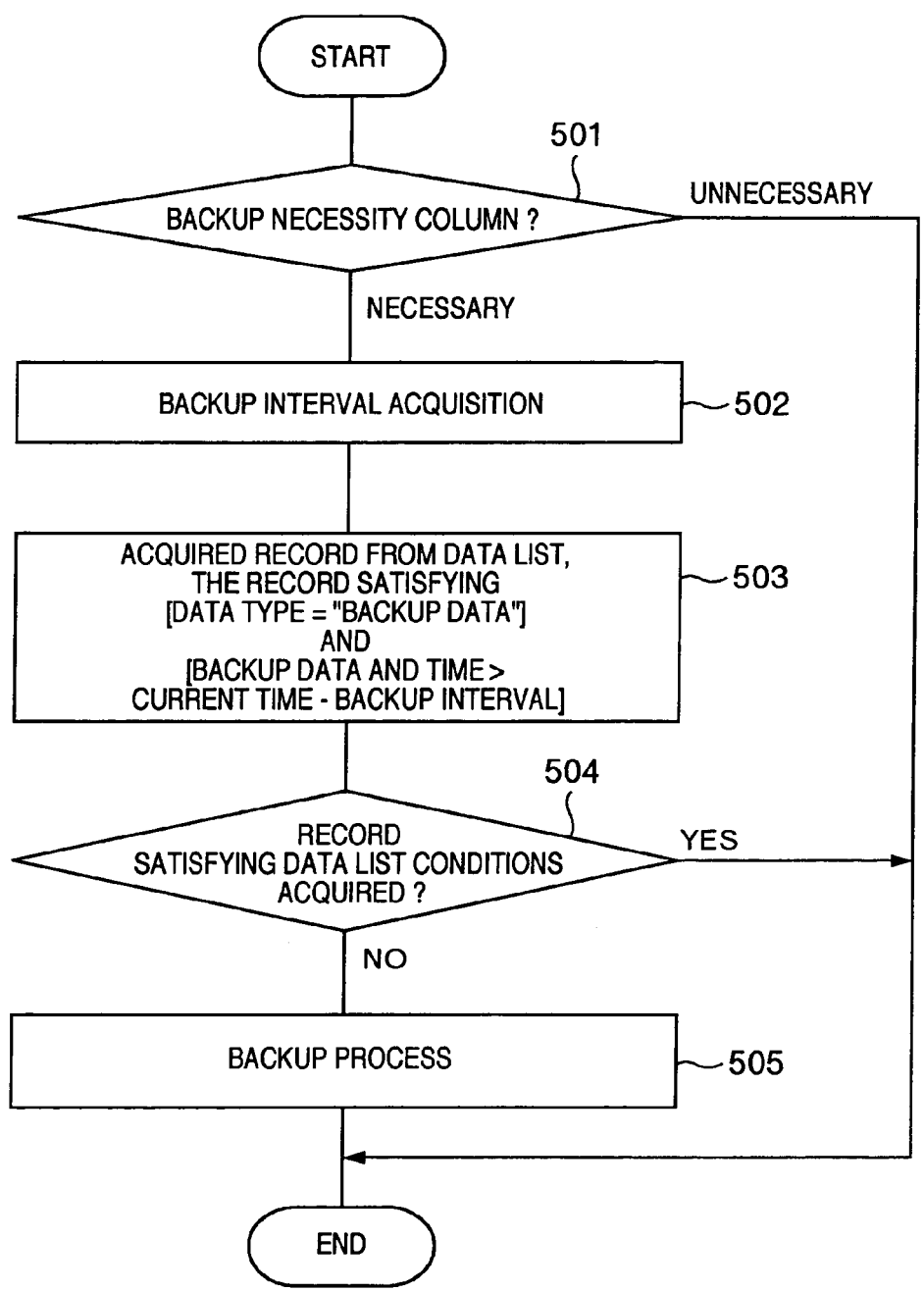
FIG. 5 is a flow chart illustrating a backup process to be executed by the second information processing apparatus 20 according to the embodiment of the invention.

FIG. 5 is a flow chart illustrating the backup process to be executed by the second information processing apparatus 20. The second information processing apparatus 20 executes the following processes after the first information processing apparatus 10 performs the fail-over process.

The second information processing apparatus 20 performs the following processes for the essential data corresponding to each record of the backup holding conditions.

It is judged by referring to the backup necessity column 302 whether the essential data requires a backup (Step 501).

If the essential data corresponding to the record requires a backup (Step 501: Necessary), the backup interval is acquired from the backup interval column 303 (Step 502).

By using the data name as a key, a record is searched from the data list, the record satisfying that the "Backup" is set to the data type column 301 and the backup date and time added to the data type column 403 is newer than the time before the backup interval from the current data and time (Step 503).

If there is the record satisfying the above conditions (Step 504: Yes), it is judged that the backup exists (backup decider) to thereafter terminate the process.

If there is no record satisfying the above conditions (Step 504: No), a backup process is performed (Step 505).

As above, the second information processing apparatus 20 at the fail-over destination judges whether there is a backup of the essential data required by the inherited processes (recovery capability judge), and if there is no backup, the backup process is performed. It is therefore possible to shorten the period while the backup of the essential data does not exist in the system. It is therefore possible to mitigate the risk of losing the essential data. Furthermore, even if a failure occurs at the second site, the essential data can be recovered from the backup. The maintenance of data in the whole system can therefore be improved.

Since the load of the backup process cannot be neglected, it is not preferable that the backup process is performed too many. According to the invention, it is possible to confirm whether the backup exists in the whole system. It is also possible to confirm whether the data during a predetermined period exists or not. If the backup does not exist, the backup process is performed even at the timing not preset for the backup process. Accordingly, the backup can be made reliably without forming an unnecessary backup.

The backup process may be performed, for example, when the first information processing apparatus 10 detects that a failure occurs at the second site. In this embodiment, although the backup is made by the first storage apparatus 30, if the backup is made by the second storage apparatus 40, the first information processing apparatus 10 detects a failure at the second site and the backup is made by the first storage apparatus 30. In this manner, the backup data is made to exist reliably in the system. The maintenance of data in the whole system can therefore be improved.

Second Embodiment

In the second embodiment, description will be made on a computer system adopting the present invention in which the computer system is constituted of three or more data centers (sites), and a remote copy is performed between two data centers among them.

Figure 6:
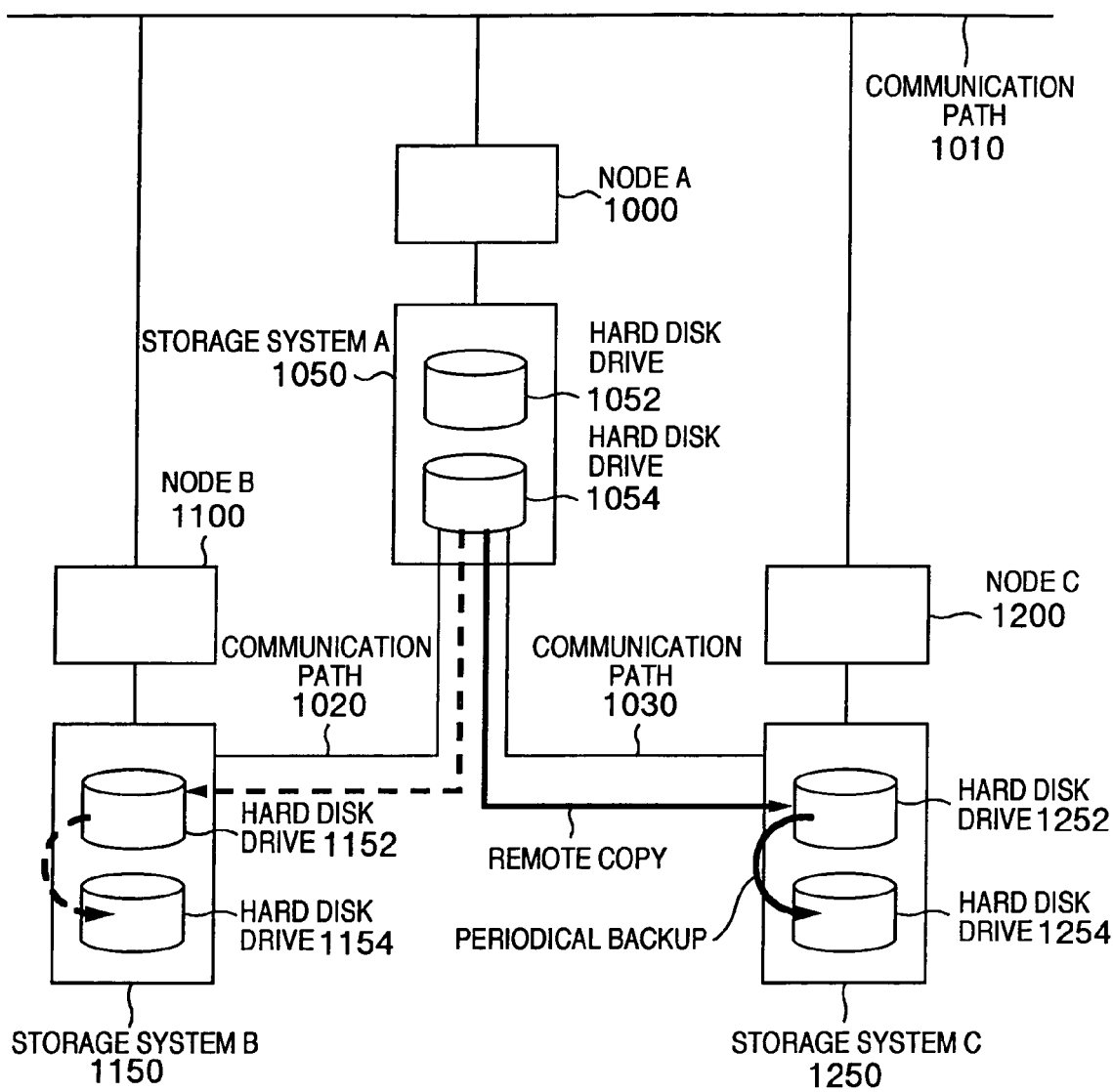
FIG. 6 is a diagram showing the configuration of a cluster system including three nodes according to an embodiment of the invention.

FIG. 6 is a diagram showing the configuration of a cluster system constituted of three nodes according to the second embodiment. Each node is a computer providing a cluster service, and corresponding to the information processing apparatus of the first embodiment. In the cluster system of the second embodiment, of the two data centers, if a remote copy destination data center is hit by a disaster and the remote copy cannot be continued, a data center different from the two data centers is used as a new remote copy destination data center to perform a remote copy.

In the cluster system shown in FIG. 6, three nodes (node-A 1000, node-B 1100 and node-C 1200) are interconnected by a communication path 1010. The nodes are connected to a storage system-A 1050, a storage system-B 1150 and a storage system-C 1250, respectively. The storage system-A 1050 has hard disk drives 1052 and 1054. The storage system-B 1150 has hard disk drives 1152 and 1154. The storage system-C 1250 has hard disk drives 1252 and 1254. The node-A 1000 and storage system-A 1050 are installed at a data center A. The node-B 1100 and storage system-B 1150 are installed at a data center B. The node-C 1200 and storage system-C 1250 are installed at a data center C. In this embodiment, it is assumed that the hard disk drive of each storage system is represented not by a physical hard disk drive but by a storage volume.

The storage system-A 1050 and storage system-B 1150 are interconnected by a communication path 1020 so that a remote copy from the storage system-A 1050 to the storage system-B 1150 is possible. The storage system-A 1050 and storage system-C 1250 are interconnected by a communication path 1030 so that a remote copy from the storage system-A 1050 to the storage system-C 1250 is possible.

Each node is a computer having a CPU and a memory. A cluster is realized by making CPUs execute programs stored in the memories at the nodes. The node-A 1000, node-B 1100 and node-C 1200 constitute the cluster. At the node-A 1000, an application program is executed using the hard disk drive 1054. A copy of data stored in the hard disk drive 1054 is subjected to a remote copy to the hard disk drive 1252. The contents of the hard disk drive 1252 are backed up to the hard disk drive 1254 once per eight hours. Namely, the data stored in the hard disk drive 1054 is backed up to the hard disk drive 1254 always at least in eight hours.

When a failure occurs at the storage system-C 1250, the remote copy destination of the storage system-A 1050 changes from the hard disk drive 1252 in the storage system-C 1250 to the hard disk drive 1152 in the storage system-B 1150. The processes executed at the node-C 1200 are inherited by the node-B 1100. The node-B 1100 inherits the processes executed by the node-C 1200. The node-B 1100 also performs the backup process for the data remote-copied by the node-C 1200. Namely, the data remote-copied to the hard disk drive 1152 is backed up to the hard disk drive 1154. However, if the backup process by the node-B 1100 is not performed at the time when the fail-over is performed from the node-C 1200 to the node-B 1100, the backup of the essential data stored in the hard disk drive 1054 does not exist in the cluster system at any location. Therefore, if the contents of the hard disk drive 1054 are destroyed until the next backup time (after eight hours at the longest), the contents of the hard disk drive 1152 at the copy destination are also destroyed. Namely, the essential data is lost and cannot be recovered from the backup data.

In this embodiment, therefore, when a failure occurs at the storage system-C 1250 and the remote copy destination is switched to the hard disk drive 1152 of the storage system-B 1150, the node-B 1100 checks whether the backup data in the past eight hours stored in any one of the storage apparatuses of the cluster system can be accessed, and if the backup data cannot be accessed, the contents of the hard disk drive 1152 are backed up to the hard disk drive 1154.

In this embodiments, the following two methods are given as the method of checking whether the node-B 1100 can access the backup data.

In the first method, the node-B 1100 inquires all nodes (node-A 1000, node-B 1100 and node-C 1200) about whether the backup data can be accessed (backup access capability). The time (backup time) when a backup was made is stored at each node. The node-B 1100 transmits a command (inquiry message) of inquiring the backup access capability to all the nodes (inquiry message transmitter). Upon reception of the command (inquiry message receiver), each node refers to the stored backup time, and for example if the referred value indicates that the time is not stored or the backup is not made, returns a response representative of that the backup data cannot be accessed, to the node-B 1100 (inquiry message responder). If the backup time is stored, each node judges whether the backup time is later than the time after a predetermined time (in this embodiment, eight hours) from the current time. If the backup time is later than the time after the predetermined time from the current time, each node returns a response representative of that the backup data can be accessed to the node-B 1100, whereas if not, each node returns a response representative of that the backup data cannot be accessed to the node-B 1100. If even one response representative of that the backup data can be accessed is received, the node-B 1100 performs no operation. If no response is received, the node-B 1100 controls to make a backup at the storage system-B 1150.

In the second method, the node-B 1100 presumes the backup access capability from the failure type. The node-B 1100 detects the failure type of the storage system-C 1250 as "storage system failure". If the failure type is the "storage system failure", the node-B 1100 judges that there is a possibility that the backup data cannot be accessed. If the node-B 1100 judges that the backup is necessary, the node-B 1100 controls to make a backup.

The specific operations of the above two methods will be described in the next embodiment.

Third Embodiment

In the third embodiment, description will be made on an example of a data center system having a plurality of data centers (sites) and adopting the present invention. In the data center system constituted of three data centers of the third embodiment, a backup process is performed at a data center different from a data center performing ordinary processes.

Figure 7:
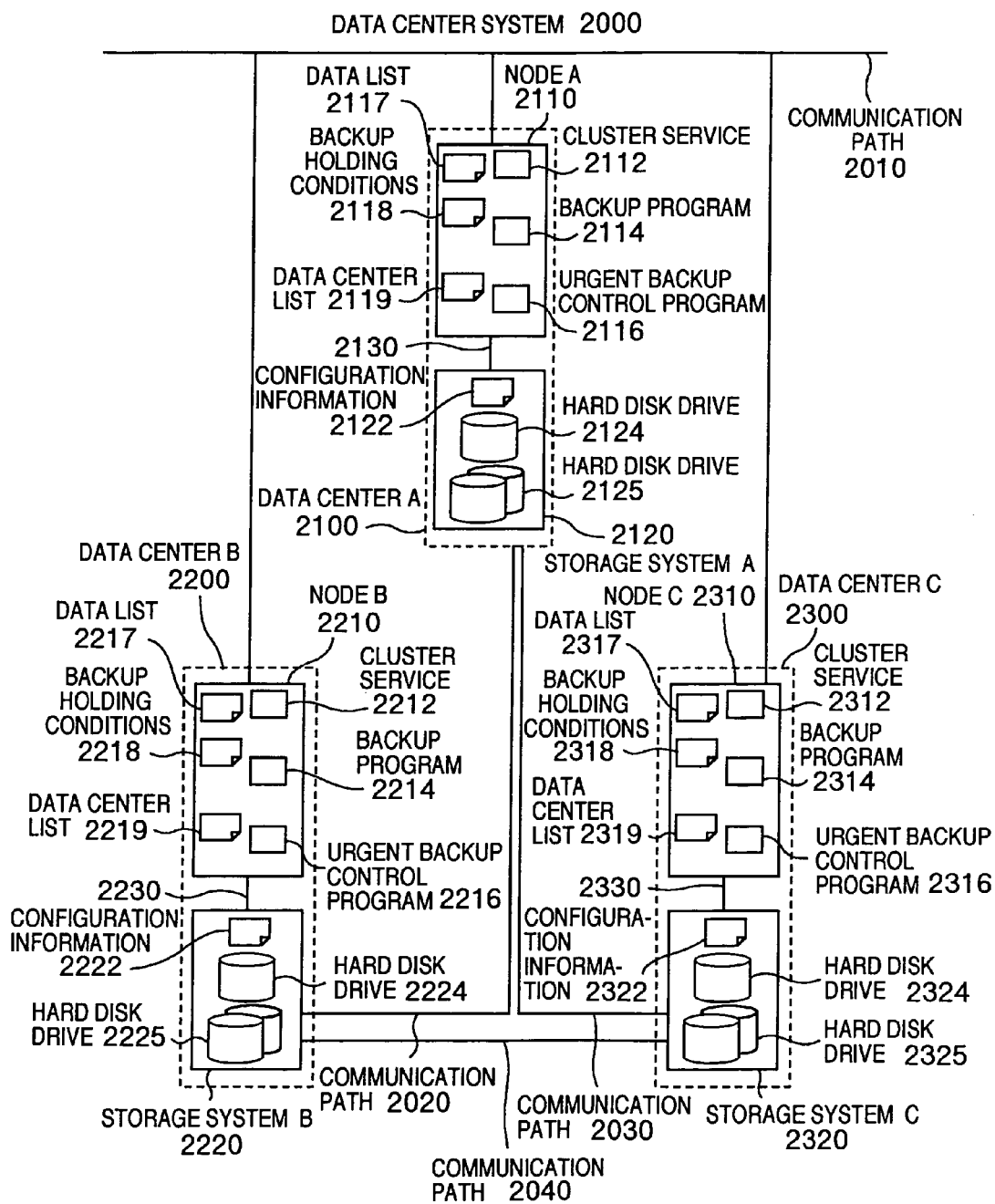
FIG. 7 is a diagram showing the overall structure of a data center system 2000 according to an embodiment of the invention.

FIG. 7 shows the overall configuration of a data center system of the embodiment. The data center system 2000 is constituted of three data centers, a data center-A 2100, a data center-B 2200 and a data center-C 2300. Each data center has a computer (node) and a storage apparatus (storage system). The node and storage system are connected by a communication path.

The nodes-A 2110, -B 2210 and -C 2310 are interconnected by a communication path 2010 to allow communications among them.

The storage systems are interconnected to allow communications among them. A storage system-A 2120 and a storage system-B 2220 are interconnected by a communication path 2020. The communication system-A 2120 and a communication system-C 2320 are interconnected by a communication path 2030, and the storage system-B 2220 and storage system-C 2320 are interconnected by a communication path 2040.

The storage system has one or more hard disk drives. The storage system-A 2120 has hard disk drives 2124 and 2125. The storage system-B 2220 has hard disk drives 2224 and 2225. The storage system-C 2320 has hard disk drives 2324 and 2325. A flash disk, a semiconductor disk or the like may be used in place of the hard disk drive.

The storage system has the function of controlling hard disks at Redundant Array of Inexpensive Disks (RAID) levels (e.g., levels 0, 1 and 5) stipulated by the RAID system. The storage system also provides nodes with logical volumes. The node transmits a data input/output request to the storage system by designating identification information (LUN) of the logical volume and an address assigned to the logical volume.

Configuration Information

The storage system stores configuration information of hard disk drives. FIG. 8 is a diagram illustrating the configuration information stored in the storage system. As shown in FIG. 8, the configuration information has a logical volume identification information column 5010, a disk drive identification information column 5020, a storage capacity column 5030, a in-use flag column 5040 and a remote copy information column 5050.

Identification information of a logical volume is set to the logical volume identification information column 5010. Information corresponding to the logical volume is set to each record of the configuration information.

Information for identifying the hard disk drive to which the logical volume is set is set to the disk drive identification information column 5020. In this embodiment, it is assumed that logical volumes are set to the whole physical volume provided by the hard disk drive. Obviously, logical volumes may be set overlapping storage areas presented by a plurality of disk drives.

A storage capacity of the storage area presented by the set logical volume is set to the storage capacity column 5030. Information representative of whether the corresponding logical volume is being used or not is set to the in-use flag column 5040. If "In-use" is set to the in-use flag column 5040, for example, it means the situation (in-use) that the corresponding logical volume stores a copy of data stored in another storage system by remote copy or that the corresponding logical volume stores a backup of data in another logical volume. If the logical volume is not in use, "Not in-use" is set to the inn-use flag column 5040.

If the logical volume is a remote copy source or destination, information of the storage system at the copy source or destination is set to the remote copy information column 5050. For example, in the records shown in FIG. 8, it is set that the logical volume #1 (volume #1) of the storage system-A 2120 is a remote copy source and data in the logical volume #1 is copied to the logical volume indicated by "Logical volume #2" in the storage system-C 2320.

FIGS. 9 to 11 show examples of configuration information 2122 stored in the storage system-A 2120, configuration information 2222 stored in the storage system-B 2220 and configuration information 2322 stored in the storage system-C 2320.

The node accesses and refers to the configuration information stored in the storage system so that it can easily grasp the configuration of the storage system.

The node executes a configuration change program for acquiring or changing the configuration of the storage system, and the configuration change program acquires the configuration of the storage system and creates/renews the configuration information. For example, the node transmits a command of inquiring the configuration of the storage system to acquire the configuration of the storage system or create/renew the configuration information. Alternatively, the administrator may set information in advance.

The configuration information is stored in a hard disk of each storage system. The storage system may have a memory to store the configuration information therein.

Configuration of Node

Next, description will be directed to the node which accesses the storage system. The node is a computer having a CPU and a memory. An application program executed by the node performs various information processing while accessing the storage system when necessary.

Figure 12:
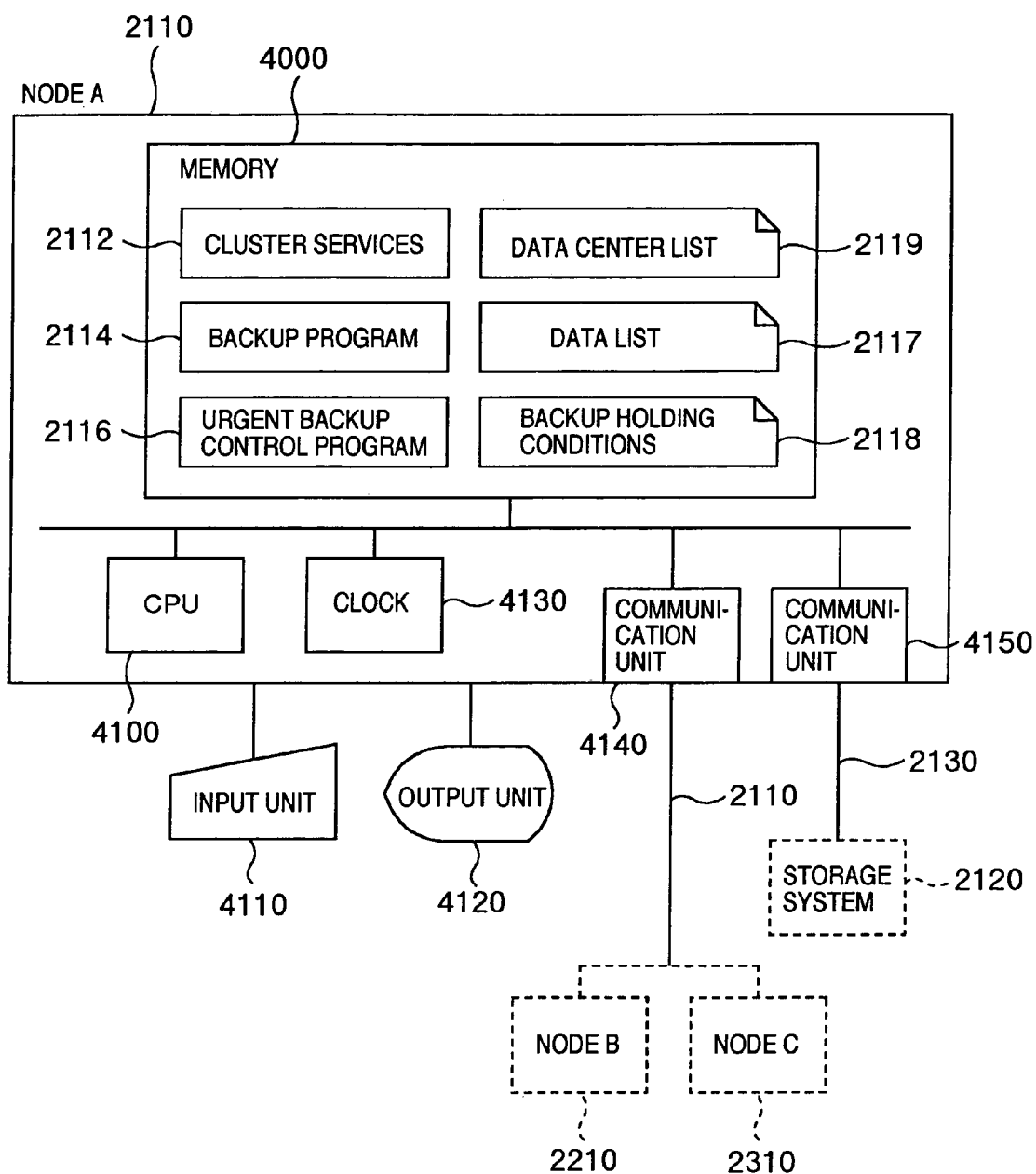
FIG. 12 is a diagram showing the configuration of a node-A 2110 according to the embodiment of the invention.

FIG. 12 shows the configuration of the node-A 2100. The node-A 2110 has a memory 4000, a CPU 4100, an input unit 4110, an output unit 4120, a clock 2130, and communication units 4140 and 4150.

The memory 4000 is a device such as a RAM for storing programs and data. CPU 4100 controls the whole of the node-A 2100. CPU 4100 executes a program stored in the memory 4000 to realize various functions such as a cluster service and processing data stored in the memory 4000.

The input unit 4110 is an input device for inputting a user's instruction, such as a keyboard, a mouse, a pen tablet and a microphone. The output unit 4120 is an output device for outputting information to a user, such as a display, a printer and a speaker.

The clock 2130 is a device for counting time. As a program under execution by CPU 4100 inquires the clock 2130 about time, the program can acquire the current time at the inquire time.

The communication units 4140 and 4150 are interfaces to communication paths such as Ethernet (registered trademark), Asynchronous Transfer Mode (ATM), public lines, and Small Computer System Interface (SCSI). The communication unit 4140 is connected to a communication path 2010 to communicate with another node. The communication unit 4150 is connected to a communication path 2130 to communicate with the storage system-A 2120.

The memory 4000 stores therein a cluster service 2112, a backup program 2114, an urgent backup control program 2116, a data list 2117, backup holding conditions 2118 and a data center list 2119. The details of the data list 2117, backup holding conditions 2118 and data center list 2119 will be later described. These programs and data may be stored in a storage system (e.g., storage system-A 2120) accessible from the node-A 2110 to allow the node-A 2110 to read them when necessary.

The configuration of the node-A 2110 has been described above, the node-B 2210 and node-C 2310 have similar configurations.

The cluster service 2112 runs on the node-A 2110. The cluster service 2212 runs on the node-B 2210. The cluster service 2312 runs on the node-C 2310. These three sets of the cluster services are operated in cooperation with each other to constitute one cluster function. Namely, when an application program executed at the node-A 2110, node-B 2210 and node-C 2310 cannot continue the processes at these nodes due to a failure, the processes are subjected to fail-over to another node.

The node-A 2110 is executing the backup program 2114 and urgent backup control program 2116. The node-B 2210 is executing the backup program 2214 and urgent backup control program 2216. The node-C 2310 is executing the backup program 2314 and urgent backup control program 2316.

The backup program under execution at each node performs a process of backing up data stored in the hard disk drive of the storage system at a predetermined timing. The backup may be performed, for example, upon an input event from an administrator instead of a predetermined timing. The backup process at each node is performed by transmitting a backup instruction command designating the hard disk drives at the copy source and destination to the storage systems. Upon reception of the backup instruction command, the storage system performs the backup process by copying data stored in the hard disk drive at the designated copy source to the hard disk drive at the designated copy destination.

If each memory has, in addition to the memory, another storage device such as a hard disk, a semiconductor memory disk, an optical disk, a CD-ROM and a DVD-ROM, this storage device may store therein the programs and data, such as the data list, backup holding conditions and data center list. The programs and data may also be stored in the storage system connected to each node.

Data Center List

Description will be made on the data center list (site information storage) stored by each node. each data center in the data center system 2000 and a node at each data center are set to the records or data center information (site information) to be stored in the data center list. FIG. 13 is a diagram illustrating the data center list. As shown in FIG. 13, the data center information includes a data center name column 12010 and a node identification information column 12020.

A name for identifying the data center is set to the data center name column 12010. Information for identifying each node is set to the node identification information column 12020.

By referring to the data center list, the node can grasp the nodes constituting the cluster and the data center (site) at each node. Each node refers to the data center list when it decides the process fail-over destination, a remote copy destination of data stored in the storage system, and the like.

The data center list stored at each node is set with data input in advance by an administrator. When a data center or a node is added to or deleted from the data center system 2000, the data center list is updated by the administrator at each node. When the data center list stored at one node is updated, the data center list may be transmitted to the other nodes to make the contents of the data center list at respective sites coincide with one another. In addition to setting the data center list by an administrator, for example, the node-A 2110 may transmit a broadcast message to the communication path 2010 to make the node-A 2110 update the data center lists upon reception of responses to the message from the other nodes.

Each node may have a user interface which is used by the administrator to set the data center list. For example, the user interface is provided with a column for inputting a site name and a column for setting a node name, a node address and the like. The node receives an input from the administrator via the user interface and registers it in the data center list (site information manager). For example, the user interface may be displayed as a window on the output unit 4120 or the like at the node-A 2110, may generate data of such as HTML and XML to transmit it to the terminal used by the administrator.

Data List

The data list stored at the node stores a list of data accessible from the node and including also backup data acquired by the backup program. Data having a copy is regarded different data even if they have the same contents. The entity of each data is called a data instance hereinafter.

FIG. 14 is a diagram showing a data list stored at the node. As shown in FIG. 14, the data list of the embodiment has the columns of the data list shown in FIG. 4 as well as a storage system identification information column 8010.

Storage system identification information for identifying the storage system is set to the storage system identification information column 8010. The storage system identification information is, for example, an ID, a name or the like assigned to the storage system.

Logical volume identification information of the logical volume of the storage system indicated by the storage system identification information column 8010 is set to a logical volume identification information column 401.

Information for identifying the essential data is set to an essential data identification information column 402. The information for identifying the essential data is, for example, an ID, a file name or the like assigned to the essential data.

A data instance type is set to a data type column 403. For example, the data instance type includes: "master data" representative of the essential data which is directly read/written by an application program executed by the node; "remote copy data" which is a copy of the master data; and "backup data" which is a backup of the essential data. If the data instance type of the backup data, time and data of the backup are additionally set.

It is possible to grasp from the data list which type the essential data is and which logical volume of which storage system stores the essential data.

FIGS. 15 to 17 are diagrams showing examples of the data list 2117 stored at the node-A 2110, data list 2217 stored at the node-B 2210 and data list 2317 stored at the node-C 2310, respectively.

The data lists 2117, 2217 and 2317 are preset by administrators and are renewed when the backup programs 2114, 2214 and 2314 make the backups.

Backup Holding Conditions

The backup holding conditions stored at the node are stored in a table to which a backup interval is set for the periodical backup of the essential data. By setting the backup holding conditions, it is possible to set an effective term of the backup data of each of the essential data, i.e., to set the backup data at what time it is required to be held. For example, it is possible to set the condition that "backup data backed up within eight hours is required to be held". The condition of a location whereat the backup data is managed can also be set (recovery data management destination decision information storage). When a failure occurs in a data center, the node judges whether the backup is necessary, by judging from the data list whether the backup data satisfying the backup holding conditions can be accessed.

FIG. 18 shows an example of the backup holding conditions 2118 stored at the node-A 2110. As shown in FIG. 18, the backup holding conditions 2118 of this embodiment include the columns of the backup holding conditions shown in FIG. 3 as well as a backup condition column 11040.

Identification information of the essential data is set to an essential data identification information column 301.

Set to a backup necessity column 302 is "Necessary" or "Unnecessary" indicating whether the backup of the essential data is necessary or unnecessary.

If "Necessary" is set to the backup necessity column 302, a backup interval is set to a backup interval column 303. The node controls to make a backup of the essential data stored in the storage system every timing set to the backup interval column 303. In this manner, the essential data backed up within the time period set to the backup interval column 303 can be accessed from the node.

Information for deciding where the backup data is managed is set to a backup condition column 11040. The information for deciding where the backup data is managed is, for example, information of whether the backup is made by the data center where the storage apparatus for storing the essential data is stored. In this embodiment, "Local backup" or "Remote backup" is set to the backup condition column 11040. The local backup means, for example, that a copy is made between logical volumes of the storage apparatus which stores the essential data and that the essential data and backup data are managed at the same data center. Conversely, the remote backup means, for example, that a copy of the essential data is made from the storage apparatus which stores the essential data by remote copy to the storage apparatus of another data center and that the backup data is managed at the data center different from the data center at the storage apparatus managing the essential data. "Preferential remote backup" can be set to the backup condition column 11040. If the "Preferential remote backup" is set to the backup condition column 11040, the node makes a backup of the essential data at the storage apparatus of a data center different from the data center at the node. The case that a backup to another data center is impossible is, for example, the case that the node or storage apparatus cannot communicate with the storage apparatus at another site due to a failure of the communication path and the case that there is no empty area of the storage capacity of the storage apparatus of the other site.

If the "Local backup" is set to the backup condition column 11040, the node makes a backup at a backup apparatus (or in a storage volume of the same storage apparatus) of the connected storage apparatus or the same data center. In this case, if the local backup is impossible, the backup is not made.

Node identification information for backup or backup data management may be set to the backup condition column 11040. In this case, a backup is made by the node corresponding to the identification information set to the backup condition column 11040 of the backup holding conditions.

Although the backup holding conditions 2118 stored at the node-A 2110 are shown in FIG. 18, the backup holding conditions 2218 stored at the node-B 2210 and the backup holding conditions 2318 stored at the node-C 2310 have similar contents.

The backup holding conditions 2118, 2218 and 2318 stored at the nodes are preset by administrators. For example, when the backup holding conditions 2118 are set by an administrator, the node-A 2110 may transmit the contents of the backup holding conditions 2118 to the nodes-B 2210 and node-C 2310 via the communication path 2010 to make each node have the same contents.

Operation Outline

The urgent backup control program to be executed by each node is an application program for performing a backup process when the node becomes a fail-over destination. When a failure occurs at the node, storage system, of communication path of some data center, a fail-over process is executed to inherit the processes at another node. The node at the fail-over destination judges whether a backup of each of the essential data is necessary, and if it is necessary, the backup program makes a backup even at a timing different from a predetermined timing.

Figure 19:
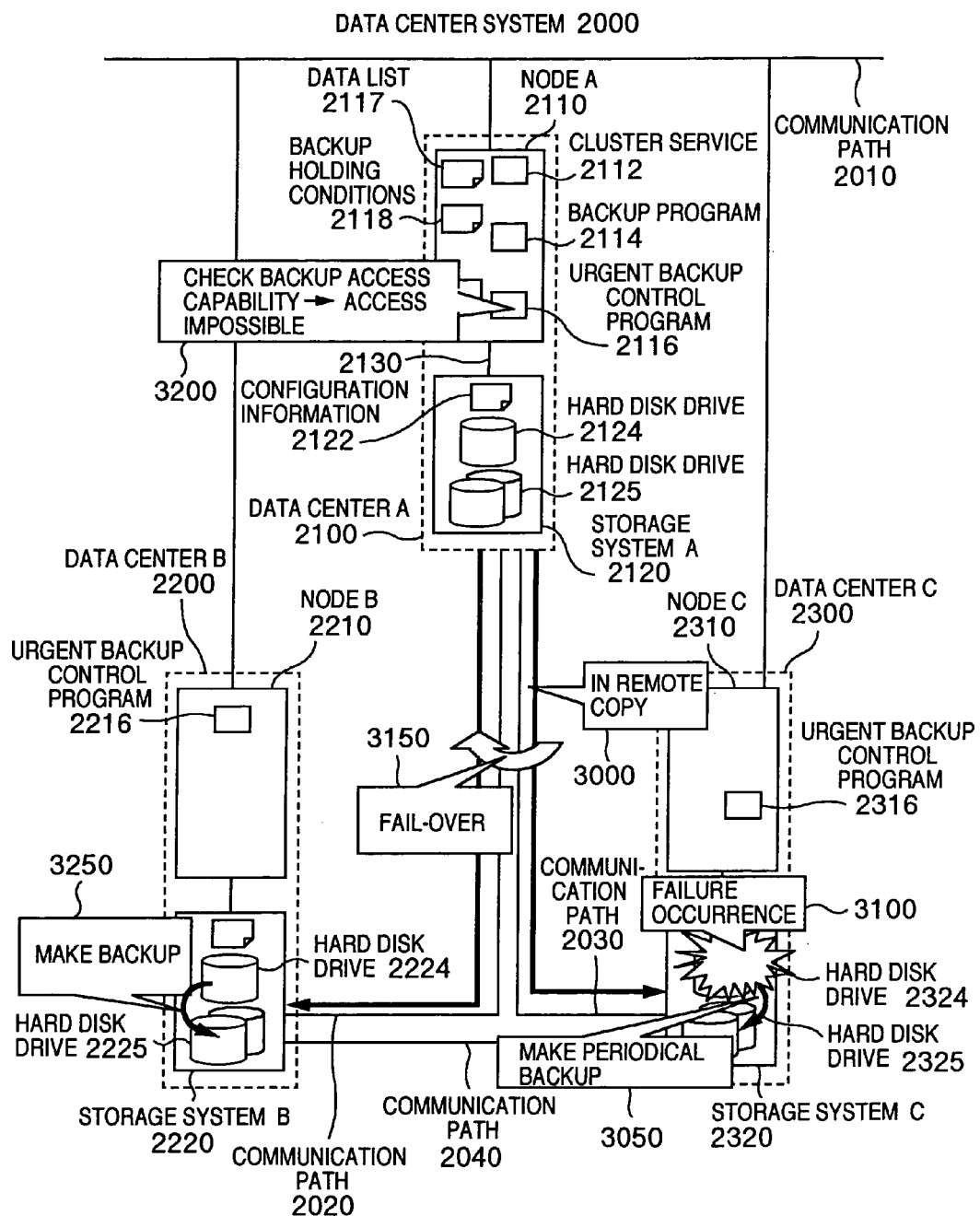
FIG. 19 is a diagram illustrating the outline of the operation of an urgent backup control program according to the embodiment of the invention.

FIG. 19 is a diagram illustrating the outline operation of the urgent backup control program.

At the node-A 2110, an application program is executed which uses the hard disk drive 2124 of the storage system-A 2120. The data stored in the hard disk drive 2124 is remotely copied via the communication path 2030 to the hard disk drive 2324 of the storage system-C 2320 at the data center-C 2300 (3000). At the data center-C 2300, the data in the hard disk drive 2324 is backed up to the hard disk drive 2325 every eight hours (3050).

When the cluster service 2112 detects that a failure occurred at the storage system-C 2320 of the data center-C 2300 (3100), the remote copy destination is switched to the hard disk drive 2224 of the storage system-B 2220 at the data center-B 2220. The cluster service 2112 notifies the failure to the urgent backup control program 2116.

Upon reception of the failure notice, the urgent backup program 2116 judges whether a backup is necessary or not, by inquiring each node registered in the data center list about whether the backup data for each of the essential data set to the data list can be accessed. For example, the inquiry to each node is performed by the node-A 2110 which transmits to the nodes-B 2210 and node-C 2310 a backup access capability check request (inquiry message) which is a command of inquiring about whether the backup data of the essential data having the name (identification information) "Data #1" (inquiry message transmitter) can be accessed. The backup access capability check request is set with identification information of the essential data and the backup interval set to the backup holding conditions. Upon reception of the command (inquiry message receiver), the node-B 2210 and node-C 2310 check whether the backup data can be accessed and respond to the command (response message responder). A process of checking whether the backup data can be accessed at each node will be later described.

In the example shown in FIG. 19, since the failure occurs at the storage system-C 2320, the node-C 2310 cannot access the hard disk drive 2325 storing the backup data. The storage system-B 2220 of the data center-B 2200 does not store the backup data of the essential data (e.g., presumably having the name "Data #1") stored in the hard disk drive 2124. Accordingly, as the node-A 2110 transmits to the node-B 2210 and node-C 2310 the inquiry message about whether the backup data of the "Data #1" is being stored, the node-B 2210 and node-C 2310 both return the response to the effect that the backup data is not stored. Since the backup does not exist in the data center system 2000 (since the backup data cannot be accessed), the node-A 2110 judges that the backup is necessary (3200). The node-A 2110 transmits a backup command to the node-B 2210, the backup command instructing to back up the data stored in the hard disk drive 2224 of the storage system-B 2220 to the hard disk drive 2225. Upon reception of the backup command, the storage system-B 2220 at the node-B 2210 backs up the data stored in the hard disk drive 2224 to the hard disk drive 2225 (3250).

If a failure occurs in the whole of the data center-A 2100, the cluster service 2312 under execution by the node-C 2310 at the data center-C 2300 performs a fail-over of the program under operation at the node-A 2110 to the node-C 2310. The cluster service 2312 also operates to set the data stored in the hard disk drive 2324 of the storage system-C 2320 to the master data and to remote copy the data stored in the hard disk drive 2324 to the hard disk drive 2224. The cluster service 2312 also notifies the urgent backup control program 2316 of that the fail-over was performed.

Upon reception of this notice, the urgent backup control program 2316 transmits the backup access capability check request to the node-A 2110 and node-B 2210. As the urgent backup control program 2316 receives from the node-A 2110 and node-B 2210 a response to the effect that the backup data cannot be accessed (response message receiver), the urgent backup control program 2316 then transmits to the nodes-A 2110 and node-B 2210 a command (hereinafter called a backup capability check request) of inquiring about whether the essential data can be backed up (backup capability inquiry message transmitter). The identification information of the essential data is set to the backup capability check request (backup capability inquiry message). For example, if the response to the effect that the backup is possible is received from the node-B 2210, a command (hereinafter called a backup make request) is transmitted to the node-B 2210 to instruct to make the backup of the essential data. Upon reception of the backup make request, the node-B 2210 controls to make the backup copy of the essential data at the storage system-B 2220.

Urgent Backup Control Program

When a failure occurs at any one of the data center-A 2110, data center-B 2200 and data center-C 2300, the cluster service 2112 transmits a failure occurrence event indicating a failure occurrence to the urgent backup control program 2116.

The cluster service 2112 also transmits an on-line event indicating a use start of the storage system-A 2120 to the urgent backup control program 2116 when a copy destination or source of a remote copy using the hard disk drive of the storage system-A 2120 as a copy source or destination is changed.

The urgent backup control program 2116 performs the following processes upon reception of a notice of the failure occurrence event or on-line event. Upon reception of a command for the backup access capability check request, backup capability check request or backup make request, the urgent backup control program 2116 also performs processes corresponding to the received command.

Figure 20:
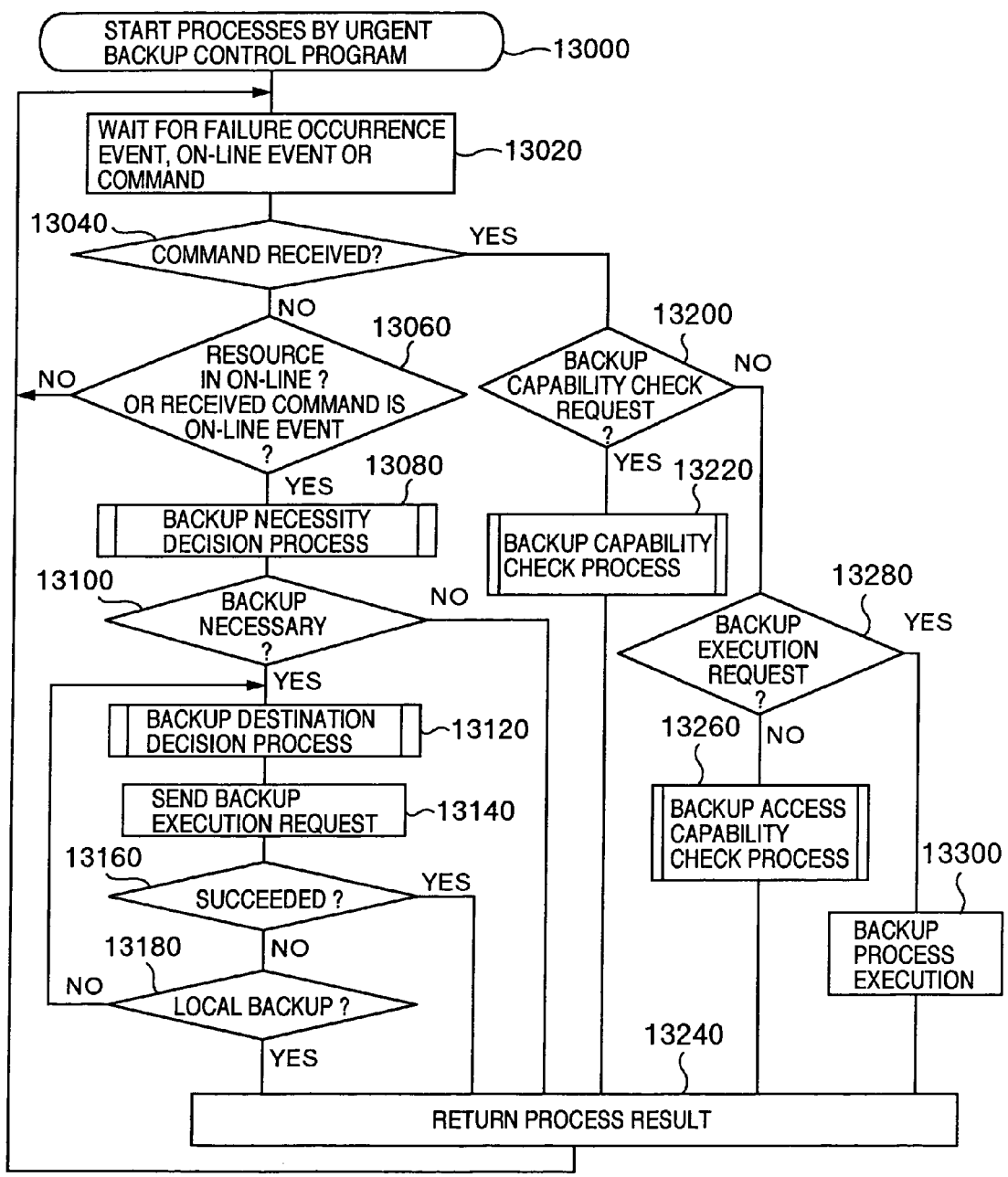
FIG. 20 is a diagram illustrating the process flow to be executed by an urgent backup control program 2116 according to the embodiment of the invention.

FIG. 20 illustrates a process flow of the urgent backup control program 2116. The process flows of the urgent backup control programs 2216 and 2316 are similar to the process flow of the urgent backup control program 2116 to be described hereinunder.

As the process starts (Step 13000), it stands by until a failure occurrence event, on-line event or command arrives (Step 13020). When an even or command is received (inquiry message receiver), it is judged whether the received one is an event or a command (Step 13040).

If a command is received, it is judged whether the received command is a backup capability check request (Step 13200), and if it is the backup capability check request (Step 13200: Yes), a backup capability check process to be described later is performed (Step 13220), a process result is answered back (Step 13240), and the process from (Step 13020) continues.

If the received command is not the backup capability check request (Step 13200: No), it is judged whether the received command is a backup execution request for making a backup (Step 13280). If the received command is the backup execution request (Step 13280: Yes), the backup program is notified to execute a backup process to make a backup (Step 13300), the process result of the backup program is answered back (step 13240), and the process from (Step 13020) continues. When the backup is made, the backup date and time in the data type column 8040 of the data list 2117 corresponding to the volume at the backup destination is renewed to the current date and time.

If the received command is neither the backup capability check request nor the backup execution request (Step 13280: No), the backup access capability check process to be described later is performed (Step 13260), a process result is answered back (Step 13240) and the process from (Step 13020) continues.

If the failure occurrence event or on-line event is received (Step 13040: No), it is judged either whether the node-A 2110 already uses the storage system-A 2120 (the storage resource is in an on-line state) or whether the on-line event is received (Step 13060). If the storage resource presented by the storage system-A 2120 is in an on-line state or if the on-line event is received (Step 13060: Yes), a backup necessity decision process to be described later is performed (Step 13080). If not, the flow returns to (Step 13020) to continue the process.

If the result of the backup necessity decision process indicates that a backup is necessary (Step 13100: Yes), a backup destination decision process to be described later is performed to decide which data center makes the backup (Step 13120). A backup execution request is transmitted to the node where the data center decided by the backup destination decision process is installed (Step 13140), and a response to the transmitted backup execution request is received to judge whether the backup was succeeded (Step 13160). If the backup failed (Step 13160: No), it is judged whether the backup process is the local backup, basing upon whether the node at the transmission destination of the backup execution request is its own node (node-A 2110) (Step 13180). If the backup is not the local backup (Step 13180: No), the flow returns to (Step 13120) to decide the backup destination other than the node at the transmission destination of the backup execution request.

If the backup necessity decision process (Step 13080) decides that the backup is necessary (Step 13100: Yes), it is assumed that the processes from the backup destination decision process (Step 13120) to the result return (Step 13240) are performed for the essential data registered in the data list 2117 and set with "Master data".

Backup Necessity Decision Process

Figure 21:
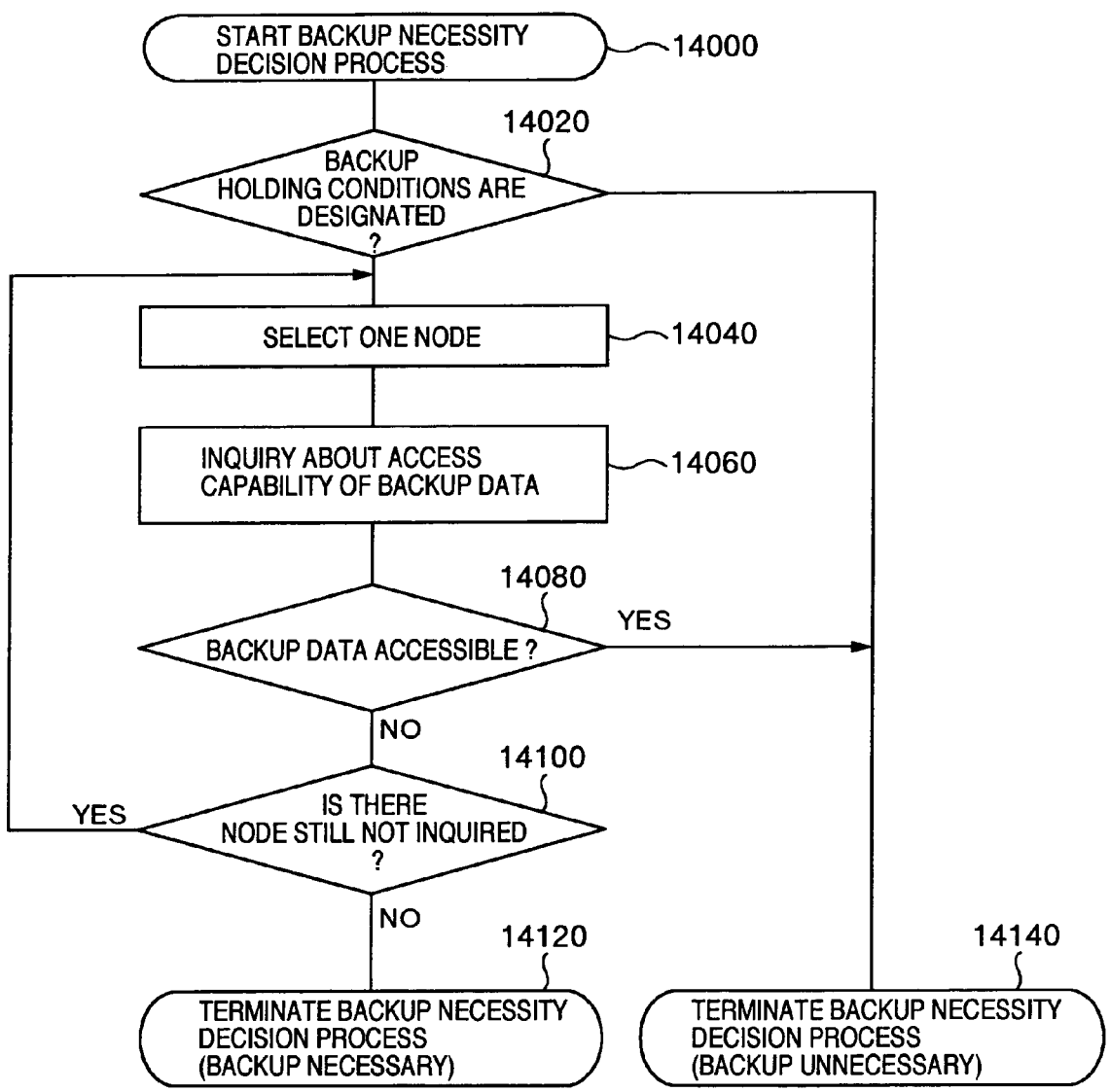
FIG. 21 is a diagram illustrating a backup necessity decision process flow according to the embodiment of the invention.
Figure 22:
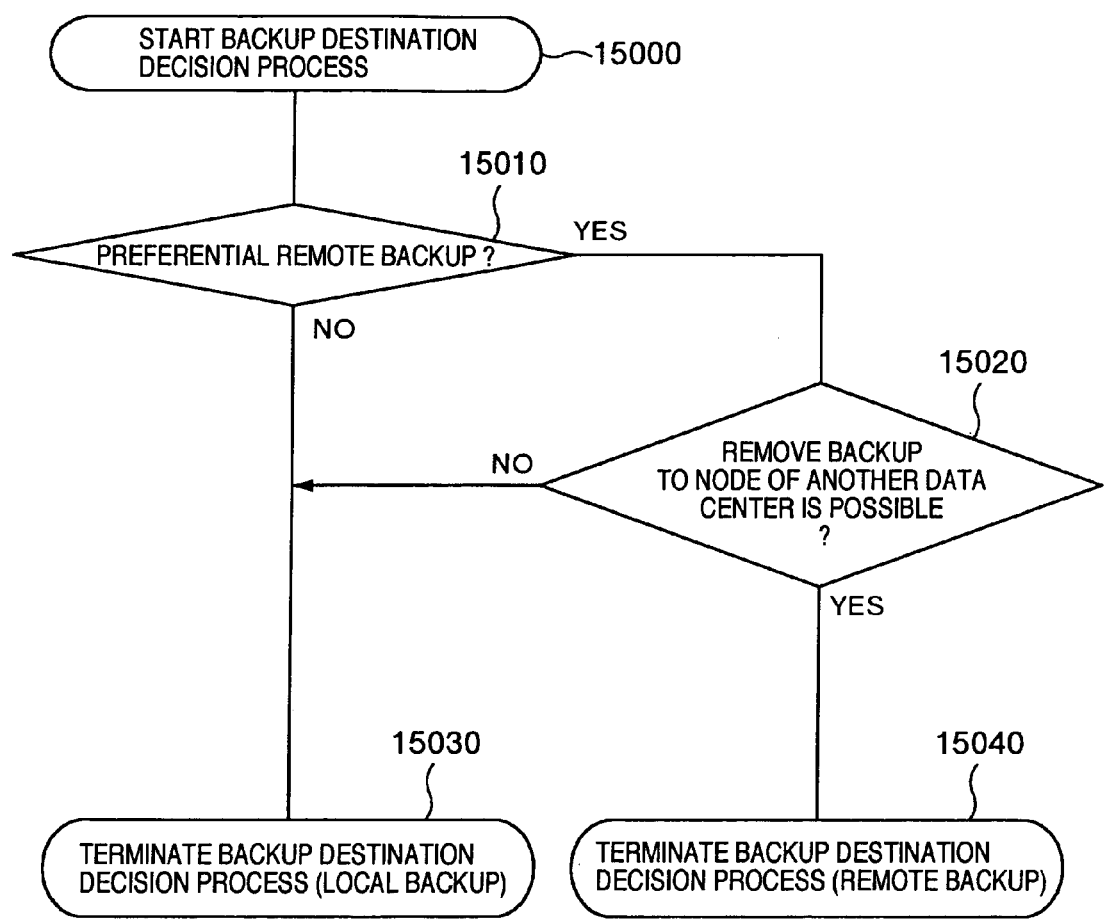
FIG. 22 is a diagram illustrating a backup destination decision process flow according to the embodiment of the invention.

Description will be made on the backup necessity decision process (Step 13080 shown in FIG. 20) which is performed when the urgent backup control program 2116 receives a failure occurrence event and the storage system-A 2120 is on-line or when the urgent backup control program 2116 receives an on-line event (Step 13070: Yes, shown in FIG. 20). FIG. 21 is a flow chart illustrating the backup necessity decision process.

When the process starts (Step 14000), the essential data set with "Necessary" in the backup necessity column 302 is extracted from the backup holding conditions 2118 (Step 14020). If the essential data set with "Necessary" in the backup necessity column 302 of the backup holding conditions 2118 cannot be extracted, the backup necessity decision process judges that the backup is unnecessary to terminate the backup necessity decision process (Step 14140).

If the essential data set with "Necessary" in the backup necessity column 302 of the backup holding conditions 2118 can be extracted, one node is selected from all nodes registered in the data center list (Step 14040). If "Preferential remote backup" is set to the backup condition column 11040 of the backup holding conditions 2118, the node-A 2110 is not selected but another node is selected.

A backup access capability check request is transmitted to the selected node, the backup access capability check request being set with the identification information of the essential data and the hour set to the backup interval column 303 of the backup holding conditions 2118 (Step 14060), and a response to the transmitted request is received. By referring to the received response, it is judged whether the backup data can be accessed at the node at the transmission destination of the backup access capability check request (Step 14080). If the backup data can be accessed at the selected node (step 14080: No), it is judged that the backup is unnecessary and the backup necessity decision process is terminated (Step 14140).

If it is judged that the selected node cannot access the backup data (Step 14080: No), the node at the next transmission destination of the backup access capability check request is selected from the data center list and the flow advances to (Step 14060). If the next node cannot be selected (if there is no node not inquired), it is judged that the backup is necessary and the backup necessity decision process is terminated (Step 14120).

Backup Destination Decision Process

Next, description will be made on the backup destination decision process (Step 13120 shown in FIG. 20) which is executed when the urgent backup control program 2116 judges in the backup necessity decision process that the backup is necessary (Step 13100: Yes, shown in FIG. 20). It is assumed that the essential data is already identified when the backup destination decision process of the urgent backup control program 2116 is executed.

When the process starts (Step 15000), it is checked whether "Preferential remote backup" is set to the backup condition column 11040 of the backup holding conditions 2118 corresponding to the essential data (Step 15010). If "Preferential remote backup" is set (Step 15010: Yes), a backup capability request to be described later is transmitted to the node at the data center other than the data center-A 2100 in the data center list, a response to this request is received, and it is judged whether the other data center can make a backup (remote backup) of the essential data (Step 15020). If the remote backup is possible (Step 15020: Yes), the selected node is decided as the backup destination to terminate the backup destination decision process (Step 15040).

If "Preferential remove backup" is not set to the backup condition column 11040 of the backup holding conditions 2118 (Step 15010: No) or the remote backup is not possible (Step 15020: No), it is decided that the backup (local backup) is made at the data center-A 2100 to terminate the backup destination decision process (Step 15030).

When the backup destination decision process decides that the remote backup is made (Step 15040), it can be considered that a response may be received which indicates that a plurality of nodes can become the backup destination. In this case, the backup may be made at the data center installed with the node first responded that the backup was possible, or the priority order of data centers as the backup destination may be determined in advance, and the backup capability is inquired in this priority order to make the backup at the data center first responded that the backup was possible. For example, a priority order setting column may be provided in the data center list. The backup may be made at a plurality of data centers.

Backup Access Capability Check Process

Figure 23:
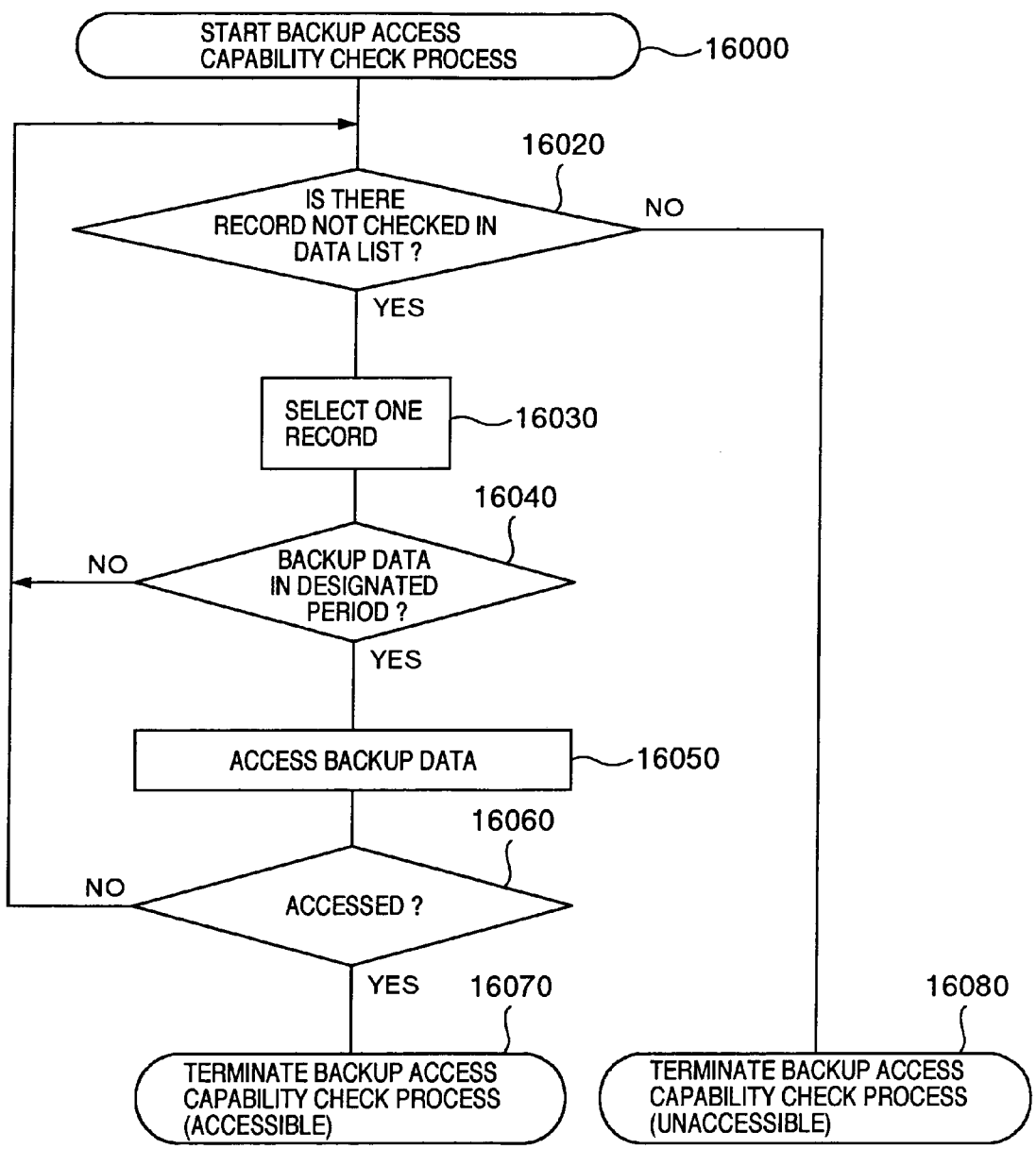
FIG. 23 is a diagram illustrating a backup access capability decision process flow according to the embodiment of the invention.

Next, description will be made on the backup access capability check process (Step 13260 in FIG. 20) which is performed when the urgent backup control program 2116 receives the backup access capability check request (Step 13280: No, shown in FIG. 20). FIG. 23 is a flow chart illustrating the backup access capability check process.

When the process starts (Step 16000), the following processes are performed for each of the records registered in the data list 2117 possessed by the node-A 2110 (Step 16020, Step 16030).

It is checked whether "Backup data" is set to the data type column 8040 of the data list 2117 corresponding to the essential data set to the backup access capability check request, and whether the backup date and time added to the "Backup data" is later than the time after the date and time set to the backup access capability check request from the current time, i.e., whether the backup data is in the designated period (Step 16040).

If the backup data is in the designated period (Step 16040: Yes), an input/output request for data in the logical volume indicated by the logical volume identification information column 401 of the data list 2117, is transmitted to the storage system-A 2120 to judge whether the logical volume can be accessed (Step 16050). If the logical volume can be accessed (Step 16060: Yes), it is judged that the backup data can be accessed to terminate the backup access capability check process (Step 16070).

If the backup data is not in the designated period (Step 16040: No) or it is not possible to access the logical volume of the storage system-A 2120 (Step 16060), the flow returns back to (Step 16020) to check another record registered in the data list 2117.

If it cannot be judged that the backup data cannot be accessed for all records registered in the data list 2117 (Step 16020: No), it is judged that the backup data cannot be accessed to terminate the backup access capability check process (Step 16080).

The current time is acquired from the clock 4130 of the node-A 2110.

Backup Capability Check Process

Next, description will be made on the backup capability check process (Step 13220 in FIG. 20) which is performed when the urgent backup control program 2116 receives the backup capability check request (Step 13200: Yes, shown in FIG. 20). FIG. 24 is a flow chart illustrating the backup capability check process.

When the process starts (Step 17000), acquired from the data list 2117 is the logical volume corresponding to the identification information of the essential data set to the backup capability check request. It is judged whether the essential data can be accessed, basing upon whether the data read process from the acquired logical volume succeeds (Step 17020). The data read process from the logical volume is, for example, to transmit a read request designating the logical volume to the storage system-A 2120. It is possible to judge from a response to the read request returned back from the storage system-A 2120 whether the data read process has succeeded. If "Backup data" is set to the data type column 8040 of the data list 2117, it is judged that the essential data cannot be accessed.

If it is judged that the essential data cannot be accessed (Step 17020: Yes), it is judged that the backup cannot be made (backup impossible) to terminate the backup capability check process (Step 17080).

If it is judged that the essential data can be accessed (Step 17020: Yes), by referring to the configuration information 2122 stored in the storage system-A 2120 it is judged whether there is a logical volume having an empty capacity equal to or larger than the essential data (Step 17040). If there is such a logical volume (Step 17040: Yes), it is judged that the backup can be made (backup possible) to terminate the backup capability check process (Step 17060).

The urgent backup control program 2116 can be realized by the processes described above. Similar processes are executed by the urgent backup control program 2216 to be performed by the node-B 2210 and the urgent backup control program 2316 to be performed by the node-C 2310.

The foregoing description has been directed to that the backup necessity decision process (Step 13080 shown in FIG. 20) of the urgent backup control program inquires each node about whether the backup data can be accessed to thereby judge whether the backup is necessary. The urgent backup control program 2116 may receive the failure occurrence event and judge whether the backup is necessary, in accordance with the type of failure.

Failure-Specific Backup Necessity List

Description will be made on the process of judging whether the backup is necessary, in accordance with the failure type.

If the backup necessity is decided in accordance with a failure type, each node stores in the memory 4000 a failure-specific backup necessity list (failure-specific failure necessity information storage) showing a correspondence between a failure type and a backup necessity.

FIG. 25 is a diagram showing an example of the failure-specific backup necessity list. As shown in FIG. 25, the failure-specific backup necessity list has a failure type column 19000 and a backup necessity column 19010. It is assumed that the cluster service notifies a failure occurrence event by adding information of a failure type thereto.

Set to the failure type column 19000 is information representative of the failure type set by the cluster service 2112 to the failure occurrent event. Information of the failure type is, for example, names such as shown in FIG. 25. Information of the failure type may be an error code or the like.

Set to the backup necessity column 19010 is information on whether the backup becomes necessary when a failure of the type set to the failure type column 19000 occurs.

Backup Necessity Check Process by Failure Type

Figure 26:
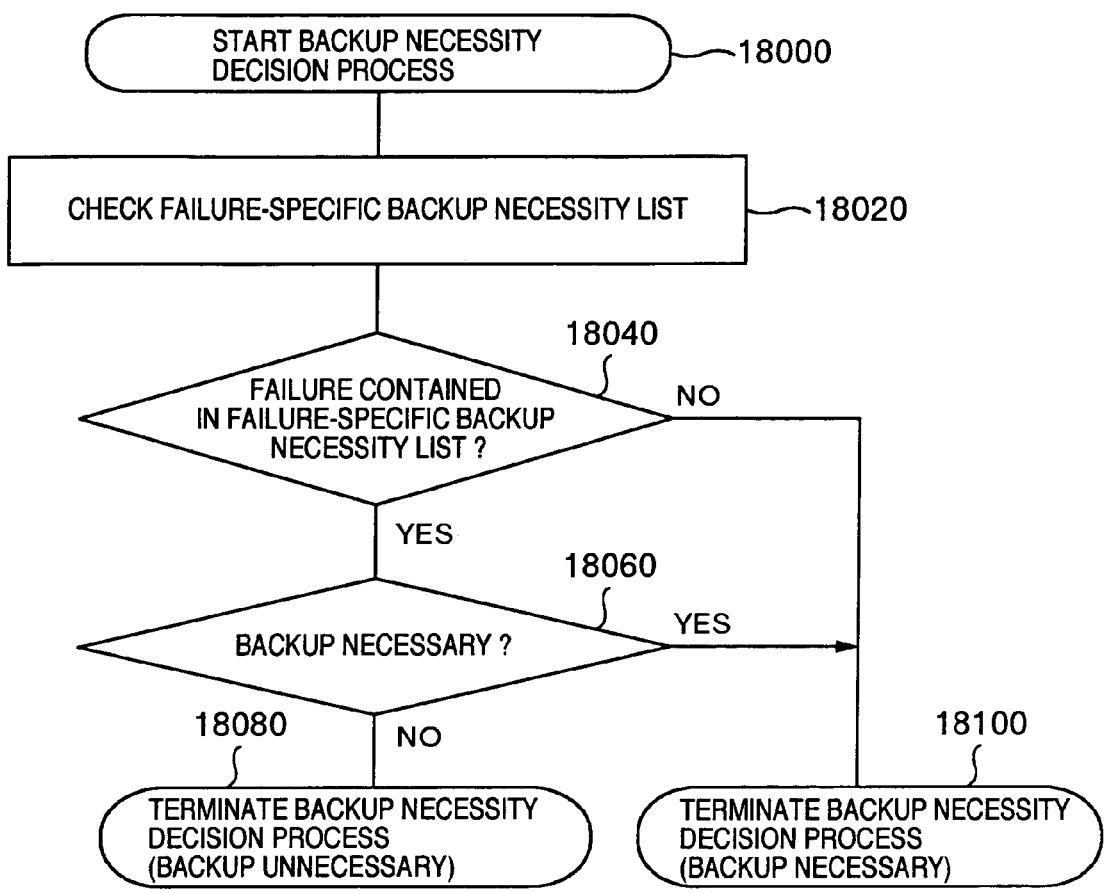
FIG. 26 is a diagram illustrating a backup necessity decision process flow specific to each failure according to the embodiment of the invention.

FIG. 26 is a flow chart illustrating the backup necessity decision process to be performed in accordance with the failure type.

When the process starts (Step 18000), the failure-specific backup necessity list is searched (Step 18020), and it is checked whether the record corresponding to the failure type set to the failure occurrence event is registered in the failure-specific backup necessity list (Step 18040). If the record is not registered in the failure-specific backup necessity list (Step 18040: No), it is judged that the backup is necessary to terminate the backup necessity decision process (Step 18100).

By referring to the backup necessity column 19010 of the failure-specific backup necessity list corresponding to the failure type, it is judged whether the backup is necessary, basing upon whether "Necessary' is set (Step 18060), to terminate the backup necessity decision process (if "Unnecessary" is set, Step 18080, whereas if "Necessary" is set, Step 18100).

If the urgent backup control program executes the failure-specific backup necessity check process, the backup holding conditions 2118, 2218 and 2318 stored at the nodes may be omitted. Since the backup access capability check request is not transmitted, the urgent backup control program can omit the processes (step 13280 and Step 13260) of judging the backup access capability check request in the flow chart shown in FIG. 20.

Information set to the failure type column 19000 of the failure-specific backup necessity list may be a failure location instead of the failure type. The failure location may be "node", "storage apparatus", "disk drive", "communication route" and the like. In this case, the node stores a correspondence between identification information of the essential data and information of the failure location (failure location specific recovery necessity information storage).

Others

In the second and third embodiments, the data center system is constituted of three data centers and each data center has one node and one storage system. However, the number of data centers, the number of nodes per data center and the number of storage systems per data center are not limited thereto, but any desired numbers may be set.

The data formats of the configuration information 2122, 2222 and 2322, data lists 2117, 2217 and 2317, backup holding conditions 2118, 2218 and 2318 and data center lists 2119, 2219 and 2319 may be binary formats or databases. These configuration information, data lists and backup holding conditions may not be disposed at each node, but may be disposed at any one or more nodes to make each node refer to them when necessary. A shared disk capable of being shared by nodes may be provided to store the configuration information, data lists and backup holding conditions.

The backup access capability check request of inquiring whether the backup can be accessed, designates the time representative of the backup interval (the backup before how may hours is to be searched). Instead, the backup time may not be designated, but the backup access capability check process may refer to the backup holding conditions.

In the above-described process, after the occurrence of a failure the urgent backup control program judges whether the backup is necessary, basing upon whether the backup data can be accessed. This judgement may be made basing upon the number of backup data records. If the backup data cannot be accessed by data centers larger in number than the number of data centers designated in advance, the urgent backup control program may judge that the backup is necessary.

If the backup data cannot be accessed, the urgent backup control program may output an alarm message to the output apparatus to make a user in charge of this, without making the backup. Whether an alarm message is output or the backup is made, may be determined in accordance with the failure type.

In addition to a data center system constituting a cluster, the present invention is applicable to a single computer. A backup is made periodically on the computer, and when a failure is detected at a hard disk drive storing backup data, the data is backed up to another disk or another device.

The foregoing description is intended to facilitate the understanding of the present invention, and does not limit the present invention. It is obvious that the invention may be altered or improved without departing from the scope and spirit of the present invention and the invention contains its equivalents.

What is claimed is:

1. An information processing system comprising:
   an information processing apparatus installed at each of a plurality of sites, said information processing apparatuses being interconnected to be able to communicate with each other;
   a fail-over processor realized by a program executed by one or more information processing apparatuses, wherein when a failure occurs at one of said information processing apparatuses, said fail-over processor performs a process related to fail-over of making another information processing apparatus different from said information processing apparatus hit by said failure inherit processes executed by said information processing apparatus hit by said failure;
   a recovery capability judge for judging whether essential data is managed in a recoverable state at any one of said information processing apparatuses excepting said information processing apparatus hit by said failure, when said fail-over is executed passing from said information processing apparatus hit by said failure to said other information processing apparatus, said essential data being necessary data for performing a process to be dealt with by said other information processing apparatus after said fail-over; and
   a backup data generator for generating backup data necessary for recovering said essential data if said essential data is not managed in the recoverable state, wherein:
   an inquiry message transmitter which transmits an inquiry message added with identification information of said essential data from said information processing apparatus to said other information processing apparatus, said inguiry message inguiring about whether said essential data is managed in the recoverable state at said other information processing apparatus; and
   said information processing apparatus for receiving said inquiry message comprises:
   a backup data management information storage realized by a program executed by said information processing apparatus, said backup data management information storage storing a correspondence between information indicating whether said essential data is managed in the recoverable state at said information processing apparatus and said identification information of said essential data;
   an inquiry message receiver for receiving said inquiry message; and
   an inquiry message responder for acquiring from said backup data management information storage, information indicating whether said essential data is managed in the recoverable state at said information processing apparatus, said information corresponding to said identification information added to said inquiry message added to said inquiry message received by said inquiry message receiver, and for answering back said response to a transmission source of said inquiry message, said response being set with information of whether said essential data is managed in the recoverable state at said information processing apparatus.

2. The information processing system according to claim 1, further comprising:
   a management information storage which stores backup holding conditions having information which indicates whether essential data requires a backup and at what interval a backup is made if backup is necessary and a data list having information which indicates whether a backup of the essential data exists and a time when the backup of the essential data occurred;
   wherein said recovery capability judge judges whether the essential data is managed in a recoverable state by:
   determining, based on the backup holding conditions, whether the essential data requires a backup and at what interval the backup is to be made if backup is necessary, if the essential data requires a backup, determining, based on the data list, whether a backup of the essential data satisfying the backup holding conditions exists, and if a backup of the essential data satisfying the backup holding conditions does not exist, conducting backup of the essential data.

3. The information processing system according to claim 1, wherein:

said backup data management information storage stores the information of whether said essential data is managed in the recoverable state at said information processing apparatus and information necessary for reading said backup data, in correspondence with said identification information of said essential data;

said information processing apparatus further comprises a backup data reader realized by a program executed by said information processing apparatus, said backup data reader performing a process of reading said backup data in accordance with the information necessary for reading said backup data;

said inquiry message responder acquires from said backup data management information storage the information of whether said essential data is managed in the recoverable state at said information processing apparatus and the information necessary for reading said backup data, respectively corresponding to said identification information added to said inquiry message received at said inquiry message receiver, and judges whether said essential data is managed in the recoverable state at said information processing apparatus, in accordance with the information of whether said essential data is managed in the recoverable state at said information processing apparatus;

said inquiry message responder returns back said response set with the information representative of that said essential data is not managed in the recoverable state at said information processing apparatus, to a transmission source of said inquiry message, if said inquiry message responder judges that the essential data is not managed in the recoverable state at said information processing apparatus;

said backup data reader performs a process of reading said backup data in accordance with the information necessary for reading said backup data corresponding to said identification information, if said inquiry message responder judges that the essential data is managed in the recoverable state at said information processing apparatus;

if said process succeeds, said inquiry message responder returns said response set with the information representative of that said essential data is managed in the recoverable state at said information processing apparatus, back to a transmission source of said inquiry message; and if said process fails, said inquiry message responder returns said response set with the information representative of that said essential data is not managed in the recoverable state at said information processing apparatus, back to the transmission source of said inquiry message.

4. The information processing system according to claim 1, wherein:

said information processing apparatus further comprises a backup data effective term storage realized by a program executed by said information processing apparatus, said backup data effective term storage storing a correspondence between said identification information and information representative of an effective term of said backup data;

said inquiry message responder acquires from said backup data effective term storage information representative of the effective term of said backup data corresponding to said identification information added to said inquiry message;

said inquiry message responder returns back said response set with the information representative of that said essential data is managed in the recoverable state at said information processing apparatus, if said effective term is after a current date and time; and said inquiry message responder returns back said response set with the information representative of that said essential data is not managed in the recoverable state at said information processing apparatus, if said effective term before the current date and time.

5. The information processing system according to claim 2, wherein said recovery capability judge judges whether said essential data is managed in the recoverable state, by judging whether said backup data is generated at any one of said information processing apparatuses excepting said information processing apparatus hit by said failure.

6. The information processing system according to claim 2, further comprising:

an inquiry message transmitter realized by a program executed by one or more information processing apparatuses, said inquiry message transmitter transmitting an inquiry message to said other information processing apparatus when said fail-over is to be executed, said inquiry message inquiring about whether said essential data is managed in the recoverable state at said other information processing apparatus;

wherein said recovery capability receives a response to said inquiry message transmitted from said inquiry message transmitter, from said other information processing apparatus, said response being set with information indicating whether said essential data is managed in the recoverable state, and judges whether said essential data is managed in the recoverable state, in accordance with said received response.

7. The information processing system according to claim 2, further comprising:

a recovery necessity manager realized by a program executed by one or more information processing apparatuses, said recovery necessity manager storing in said management information storage a correspondence between identification information of said essential data and recovery necessity information representative of said backup data of said essential data and managing correspondence between said identification information and said recovery necessity information at any one of said information processing apparatuses;

wherein said recovery capability judge acquires said recovery necessity information of said essential data from said recovery necessity manager, if said acquired recovery necessity information indicates that said backup data of said essential data is required to be managed, said recovery capability judge performs said judge of whether said essential data is managed in the recoverable state, and if said recovery capability judge judges that said essential data is not managed in the recoverable state, said backup data generator generates said backup data.

8. The information processing system according to claim 2, further comprising:

first and second storage apparatuses connected to at least any one of said information processing apparatuses in a communication, enabled state;

wherein said first storage apparatus stores said essential data and includes a backup data controller realized by a program executed by one or more information processing apparatuses, said backup data controller controls to make said backup data generated by said backup data generator be stored in said second storage apparatus.

9. The information processing system according to claim 2, further comprises:

a storage apparatus connected to said information processing apparatus at a destination of said fail-over in a communication enabled state;

wherein:

said storage apparatus includes first and second logical volumes which are storage areas logically set to a storage area provided by said storage apparatus;

said first logical volume stores said essential data; and said backup data generator controls to store a copy of said essential data stored in said first logical volume in said second logical volume.

10. The information processing system according to claim 2, further comprising:

a first storage apparatus installed at a first site and connected with said information processing apparatus hit by said failure in a communication enabled state;

a second storage apparatus for storing a copy of said essential data stored in said first storage apparatus, said second storage apparatus being connected in a communication enabled state to said first information processing apparatus and a second information processing apparatus which inherits processed executed by said first information processing apparatus when a failure occurs at said first information processing apparatus;

a backup apparatus for storing said backup data necessary for recovering data stored in said second storage apparatus; and a backup processor realized by a program executed by one or more information processing apparatuses, said backup processor controlling to make said backup data generated by said backup data generator be stored in said backup apparatus when said fail-over is executed.

11. The information processing system according to claim 10, wherein:

said first storage apparatus has a first logical volume which is a storage area logically set to a storage area provided by said first storage apparatus, said first logical volume storing said essential data;

said second storage apparatus has a second logical volume for storing a copy of data stored in said first logical volume;

said first storage apparatus has a write data transmitter for transmitting a copy of write data in said first logical volume to said second storage apparatus, when said data is written in said first logical volume; and said second storage apparatus has a write data receiver for receiving said write data and a logical volume controller for controlling to write the received write data in said second logical volume.

12. An information processing system comprising:

an information processing apparatus installed at each of a plurality of sites, said information processing apparatuses being interconnected to be able to communicate with each other;

a fail-over processor realized by a program executed by one or more information processing apparatuses, wherein when a failure occurs at one of said information processing apparatuses, said fail-over processor performs a process related to fail-over of making another information processing apparatus different from said information processing apparatus hit by said failure inherit processes executed by said information processing apparatus hit by said failure;

a recovery capability judge for judging whether essential data is managed in a recoverable state at any one of said information processing apparatuses excepting said information processing apparatus hit by said failure, when said fail-over is executed passing from said information processing apparatus hit by said failure to said other information processing apparatus, said essential data being necessary data for performing a process to be dealt with said fail-over;

a backup data generator for generating backup data necessary for recovering said essential data if said essential data is not managed in the recoverable state; and a recovery data management destination storage realized by a program executed by one or more information processing apparatuses, said recovery data management destination storage managing a correspondence between identification information of said essential data and identification information of said information processing apparatus for making said essential data to be managed in the recoverable state, wherein said backup data generator identifies said information processing apparatus for making said essential data to be managed, in accordance with said recovery data management destination storage and makes said identified information processing apparatus to generate said backup data.

13. The information processing system according to claim 12, further comprising:

a backup capability inquiry message transmitter realized by a program executed by one or more information processing apparatuses, said backup capability inquiry message transmitter transmitting a backup capability inquiry message inquiring about whether said essential data can be managed in the recoverable state, to said information processing apparatus for making said essential data to be managed;

wherein said backup data generator controls to make any one of said information processing apparatus hit by said failure and said information processing apparatus excepting said information processing apparatus for making said essential data to be managed, generate said backup data.

14. An information processing system comprising:

an information processing apparatus installed at each of a plurality of sites, said information processing apparatuses being interconnected to be able to communicate with each other;

a fail-over processor realized by a program executed by one or more information processing apparatuses, wherein when a failure occurs at one of said information processing apparatuses, said fail-over processor performs a process related to fail-over of making another information processing apparatus different from said information processing apparatus hit by said failure inherit processes executed by said information processing apparatus hit by said failure;

a recovery capability judge for judging whether essential data is managed in a recoverable state at any one of said information processing apparatuses excepting said information processing apparatus hit by said failure, when said fail-over is executed passing from said information processing apparatus hit by said failure to said other information processing apparatus, said essential data being necessary data for performing a process to be dealt with said fail-over; and a backup data generator for generating backup data necessary for recovering said essential data if said essential data is not managed in the recoverable state, wherein said information processing apparatus comprises:

a failure detector for detecting a failure at said information processing apparatus; and a failure information transceiver for transferring failure information containing information representative of a type of said detected failure to and from another information processing apparatus, said failure detector and said failure transceiver being realized by programs executed by said information processing apparatus, and said information processing system further comprises a failure type specific recovery necessity storage realized by a program executed by one or more information processing apparatuses, said failure type specific recovery necessity storage storing a correspondence between information representative of the type of said failure and recovery necessity information representative of whether it is necessary for managing said essential data in the recoverable state, wherein when said fail-over is executed, said backup data generator acquires said recovery necessity information corresponding to the type of said failure contained in said failure information received by said failure information transceiver from said failure type specific recovery necessity storage, and generates said backup data if said recovery necessity information indicates that it is necessary to manage said essential data in the recoverable state.

15. An information processing system comprising:

an information processing apparatus installed at each of a plurality of sites, said information processing apparatuses being interconnected to be able to communicate with each other;

a fail-over processor realized by a program executed by one or more information processing apparatuses, wherein when a failure occurs at one of said information processing apparatuses, said fail-over processor performs a process related to fail-over of making another information processing apparatus different from said information processing apparatus hit by said failure inherit processes executed by said information processing apparatus hit by said failure;

a recovery capability judge for judging whether essential data is managed in a recoverable state at any one of said information processing apparatuses excepting said information processing apparatus hit by said failure, when said fail-over is executed passing from said information processing apparatus hit by said failure to said other information processing apparatus, said essential data being necessary data for performing a process to be dealt with said fail-over; and a backup data generator for generating backup data necessary for recovering said essential data if said essential data is not managed in the recoverable state, wherein said information processing apparatus comprises:

a failure detector for detecting a failure at said information processing apparatus; and a failure information transceiver for transferring failure information containing information representative of a location of said detected failure to and from another information processing apparatus, said failure detector and said failure transceiver being realized by programs executed by said information processing apparatus, and said information processing system further comprises a failure location specific recovery necessity storage realized by a program executed by one or more information processing apparatuses, said failure location specific recovery necessity storage storing a correspondence between information representative of the location of said failure and recovery necessity information representative of whether it is necessary for managing said essential data in the recoverable state, wherein when said fail-over is executed, said backup data generator acquires said recovery necessity information corresponding to the location of said failure contained in said failure information received by said failure information transceiver from said failure location specific recovery necessity storage, and generates said backup data if said recovery necessity information indicates that it is necessary to manage said essential data in the recoverable state.

16. An information processing apparatus installed at each of a plurality of sites, comprising:

a fail-over processor connected to the information processing apparatus installed at another site, wherein when a failure occurs at said other information processing apparatuses, said fail-over processor performs a process related to fail-over of inheriting processes executed by said other information processing apparatus;

a recovery capability judge for judging whether essential data is managed in a recoverable state at one of the information processing apparatuses and the information processing apparatus excepting said information processing apparatus hit by said failure, said essential data being necessary data for performing a process to be dealt with said fail-over;

a backup data generator for generating backup data necessary for recovering said essential data if said essential data is not managed in the recoverable state;

an inquiry message transmitter for transmitting an inquiry message added with identification information of said essential data from said information processing apparatus to said other information processing apparatus, said inquiry message inquiring about whether said essential data is managed in the recoverable state at said other information processing apparatus;

an inquiry message receiver for receiving said inquiry message;

a backup data management information storage for storing a correspondence between information indicating whether said essential data is managed in the recoverable state at the information processing apparatus and said identification information of said essential data; and an inquiry message responder for answering back said response to a transmission source of said inquiry message, said response being set with information of whether said essential data is managed in the recoverable state at the information processing apparatus, and said information corresponding to said identification information added to said inquiry message added to said inquiry message received by said inquiry message receiver, wherein said recovery capability judge judges whether said essential data is managed in the recoverable state, basing upon whether said response to said inquiry message transmitted by said inquiry message transmitter is set with the information representative of that said essential data is managed in the recoverable state.

17. The information processing apparatus according to claim 16, further comprising:
a management information storage which stores backup holding conditions having information which indicates whether essential data requires a backup and at what interval a backup is made if backup is necessary and a data list having information which indicates whether a backup of the essential data exists and a time when the backup of the essential data occurred;
wherein said recovery capability judge judges whether the essential data is managed in a recoverable state by:
determining, based on the backup holding conditions, whether the essential data requires a backup and at what interval the backup is to be made if backup is necessary,
if the essential data requires a backup, determining, based on the data list, whether a backup of the essential data satisfying the backup holding conditions exists, and
if a backup of the essential data satisfying the backup holding conditions does not exist, conducting backup of the essential data.

18. The information processing apparatus according to claim 16, wherein said backup data management information storage stores the information of whether said essential data is managed in the recoverable state at the information processing apparatus and information necessary for reading said backup data, in correspondence with said identification information of said essential data,
wherein the information processing apparatus further comprises a backup data reader for reading said backup data in accordance with the information necessary for reading said backup data,
wherein said inquiry message responder acquires from said backup data management information storage the information of whether said essential data is managed in the recoverable state at the information processing apparatus and the information necessary for reading said backup data, respectively corresponding to said identification information added to said inquiry message received at said inquiry message receiver, and judges whether said essential data is managed in the recoverable state at the information processing apparatus;
if said inquiry message responder judges that the essential data is managed in the recoverable state at said information processing apparatus, said backup data reader performs a process of reading said backup data in accordance with the information necessary for reading said backup data;
if said process succeeds, said inquiry message responder returns said response set, with the information representative of that said essential data is managed in the recoverable state at the information processing apparatus, back to a transmission source of said inquiry message; and
if said process fails, said inquiry message responder returns said response set with the information representative of that said essential data is not managed in the recoverable state at the information processing apparatus, back to the transmission source of said inquiry message.

19. The information processing apparatus according to claim 16, wherein said backup data management information storage stores the information of whether said essential data is managed in the recoverable manner at the information processing apparatus, the information necessary for reading said backup data, and information representative of an effective term of said backup data, respectively in correspondence with said identification information of said essential data, and
wherein the information processing apparatus further comprises a site information storage for storing, for each of other information processing apparatuses constituting a cluster for executing said fail-over together with the information processing apparatus, identification information of said other information processing apparatuses,
wherein said inquiry message responder:
acquires the effective term of said backup data corresponding to said identification information of said essential data added to said inquiry message from said backup data management information storage;
answering back the information representative of that said essential data is managed in the recoverable state at the information processing apparatus, if the effective term is after a current date and time; and
answering back the information representative of that said essential data is not managed in the recoverable state at the information processing apparatus, if the effective term is after the current date and time.

* * * * *